United States Patent
Rapoport et al.

(10) Patent No.: US 9,811,868 B1
(45) Date of Patent: Nov. 7, 2017

(54) SYSTEMS AND METHODS FOR INTEGRATING A DEAL PROCESS

(75) Inventors: David Rapoport, New York, NY (US); Daniel James Zinkin, London (GB); Joel Potts, London (GB); Vinayak Thakur, Robbinsville, NJ (US)

(73) Assignee: JPMORGAN CHASE BANK, N.A., New York, NY (US)

( * ) Notice: Subject to any disclaimer, the term of this patent is extended or adjusted under 35 U.S.C. 154(b) by 2908 days.

(21) Appl. No.: 11/468,218

(22) Filed: Aug. 29, 2006

(51) Int. Cl.
- *G06Q 50/18* (2012.01)
- *G06Q 10/10* (2012.01)
- *G06Q 40/00* (2012.01)
- *G06Q 40/02* (2012.01)

(52) U.S. Cl.
CPC ........... *G06Q 50/18* (2013.01); *G06Q 10/103* (2013.01); *G06Q 40/00* (2013.01); *G06Q 40/02* (2013.01)

(58) Field of Classification Search
CPC ........ G06Q 50/18; G06Q 40/00; G06Q 40/02; G06A 10/103
USPC ...................................... 705/1, 1.1
See application file for complete search history.

(56) References Cited

U.S. PATENT DOCUMENTS

| | | |
|---|---|---|
| 4,169,285 A | 9/1979 | Walker |
| 4,648,038 A | 3/1987 | Roberts et al. |
| 4,739,478 A | 4/1988 | Roberts et al. |
| 4,742,457 A | 5/1988 | Leon et al. |
| 4,752,877 A | 6/1988 | Roberts et al. |
| 4,933,842 A | 6/1990 | Durbin et al. |
| 5,121,469 A | 6/1992 | Richards et al. |
| 5,222,019 A | 6/1993 | Yoshino et al. |
| 5,257,369 A | 10/1993 | Skeen et al. |
| 5,270,922 A | 12/1993 | Higgins |
| 5,297,032 A | 3/1994 | Trojan et al. |
| 5,305,200 A | 4/1994 | Hartheimer et al. |
| 5,419,890 A | 5/1995 | Saidi |
| 5,454,104 A | 9/1995 | Steidlmayer et al. |
| 5,462,438 A | 10/1995 | Becker et al. |
| 5,497,317 A | 3/1996 | Hawkins et al. |
| 5,517,406 A | 5/1996 | Harris et al. |
| 5,557,798 A | 9/1996 | Skeen et al. |
| 5,592,379 A | 1/1997 | Finfrock et al. |
| 5,649,186 A | 7/1997 | Ferguson |
| 5,675,746 A | 10/1997 | Marshall |
| 5,706,502 A | 1/1998 | Foley et al. |

(Continued)

FOREIGN PATENT DOCUMENTS

| | | |
|---|---|---|
| WO | WO 98/43170 | 10/1998 |
| WO | WO 01/20530 | 3/2001 |

(Continued)

OTHER PUBLICATIONS www.jpmorgan.com, Jan. 1, 2005.*

(Continued)

*Primary Examiner* — Carrie S Gilkey
(74) *Attorney, Agent, or Firm* — Hunton & Williams LLP

(57) ABSTRACT

A system which integrates a whole deal process including creation of a deal, conflicts approval, expense tracking, and deal closure in a financial institution is disclosed. The invention consists of three main components. The first one is a flexible user interface with high navigation ability. The second one is that a user can access secured multi-layer information flow in real time. The third one is that the financial institution can get the whole deal lifecycle.

19 Claims, 27 Drawing Sheets

(56) References Cited

U.S. PATENT DOCUMENTS

| | | |
|---|---|---|
| 5,710,889 A | 1/1998 | Clark et al. |
| 5,724,593 A | 3/1998 | Hargrave, III et al. |
| 5,778,157 A | 7/1998 | Oatman et al. |
| 5,787,402 A | 7/1998 | Potter et al. |
| 5,806,047 A | 9/1998 | Hackel et al. |
| 5,806,048 A | 9/1998 | Kiron et al. |
| 5,819,273 A | 10/1998 | Vora et al. |
| 5,832,461 A | 11/1998 | Leon et al. |
| 5,845,266 A | 12/1998 | Lupien et al. |
| 5,864,827 A | 1/1999 | Wilson |
| 5,890,140 A | 3/1999 | Clark et al. |
| 5,913,214 A | 6/1999 | Madnick et al. |
| 5,918,218 A | 6/1999 | Harris et al. |
| 5,922,044 A | 7/1999 | Banthia |
| 5,940,810 A | 8/1999 | Traub et al. |
| 5,944,784 A | 8/1999 | Simonoff et al. |
| 5,946,667 A | 8/1999 | Tull, Jr. et al. |
| 5,950,176 A | 9/1999 | Keiser et al. |
| 5,966,531 A | 10/1999 | Skeen et al. |
| 5,966,672 A | 10/1999 | Knupp |
| 5,970,479 A | 10/1999 | Shepherd |
| 5,986,673 A | 11/1999 | Martz |
| 5,995,943 A | 11/1999 | Bull et al. |
| 6,006,206 A | 12/1999 | Smith et al. |
| 6,012,046 A | 1/2000 | Lupien et al. |
| 6,018,714 A | 1/2000 | Risen, Jr. |
| 6,018,721 A | 1/2000 | Aziz et al. |
| 6,023,280 A | 2/2000 | Becker et al. |
| 6,029,146 A | 2/2000 | Hawkins et al. |
| 6,029,147 A | 2/2000 | Horadan et al. |
| 6,035,287 A | 3/2000 | Stallaert et al. |
| 6,049,783 A | 4/2000 | Segal et al. |
| 6,052,673 A | 4/2000 | Leon et al. |
| 6,055,522 A | 4/2000 | Krishna et al. |
| 6,058,378 A | 5/2000 | Clark et al. |
| 6,061,662 A | 5/2000 | Makivic |
| 6,064,984 A | 5/2000 | Ferguson et al. |
| 6,073,104 A | 6/2000 | Field |
| 6,073,115 A | 6/2000 | Marshall |
| 6,078,914 A | 6/2000 | Redfern |
| 6,078,956 A | 6/2000 | Bryant et al. |
| 6,081,774 A | 6/2000 | de Hita et al. |
| 6,088,685 A | 7/2000 | Kiron et al. |
| 6,092,056 A | 7/2000 | Tull, Jr. et al. |
| 6,105,005 A | 8/2000 | Fuhrer |
| 6,131,082 A | 10/2000 | Hargrave, III et al. |
| 6,134,600 A | 10/2000 | Liu |
| 6,148,298 A | 11/2000 | LaStrange et al. |
| 6,173,270 B1 | 1/2001 | Cristofich et al. |
| 6,173,276 B1 | 1/2001 | Kant et al. |
| 6,178,420 B1 | 1/2001 | Sassano |
| 6,185,567 B1 | 2/2001 | Ratnaraj et al. |
| 6,195,647 B1 | 2/2001 | Martyn et al. |
| 6,226,623 B1 | 5/2001 | Schein et al. |
| 6,233,566 B1 | 5/2001 | Levine et al. |
| 6,236,972 B1 | 5/2001 | Shkedy |
| 6,236,977 B1 | 5/2001 | Verba et al. |
| 6,243,670 B1 | 6/2001 | Bessho et al. |
| 6,260,021 B1 | 7/2001 | Wong et al. |
| 6,263,321 B1 | 7/2001 | Daughtery, III |
| 6,263,335 B1 | 7/2001 | Paik et al. |
| 6,266,683 B1 | 7/2001 | Yehuda et al. |
| 6,272,474 B1 | 8/2001 | Garcia |
| 6,275,229 B1 | 8/2001 | Weiner et al. |
| 6,278,982 B1 | 8/2001 | Korhammer et al. |
| 6,282,537 B1 | 8/2001 | Madnick et al. |
| 6,285,986 B1 | 9/2001 | Andrews |
| 6,285,989 B1 | 9/2001 | Shoham |
| 6,304,858 B1 | 10/2001 | Mosler et al. |
| 6,313,854 B1 | 11/2001 | Gibson |
| 6,317,726 B1 | 11/2001 | O'Shaughnessy |
| 6,317,728 B1 | 11/2001 | Kane |
| 6,321,212 B1 | 11/2001 | Lange |
| 6,323,881 B1 | 11/2001 | Broulik et al. |
| 6,332,163 B1 | 12/2001 | Bowman-Amuah |
| 6,338,055 B1 | 1/2002 | Hagmann et al. |
| 6,338,068 B1 | 1/2002 | Moore et al. |
| 6,343,287 B1 | 1/2002 | Kumar et al. |
| 6,347,307 B1 | 2/2002 | Sandhu et al. |
| 6,349,291 B1 | 2/2002 | Varma |
| 6,356,933 B2 | 3/2002 | Mitchell et al. |
| 6,360,210 B1 | 3/2002 | Wallman |
| 6,366,908 B1 | 4/2002 | Chong et al. |
| 6,381,585 B1 | 4/2002 | Maples et al. |
| 6,381,586 B1 | 4/2002 | Glasserman et al. |
| 6,385,660 B2 | 5/2002 | Griesemer et al. |
| 6,389,413 B2 | 5/2002 | Takahashi et al. |
| 6,389,452 B1 | 5/2002 | Glass |
| 6,401,080 B1 | 6/2002 | Bigus et al. |
| 6,408,282 B1 | 6/2002 | Buist |
| 6,418,417 B1 | 7/2002 | Corby et al. |
| 6,421,653 B1 | 7/2002 | May |
| 6,424,980 B1 | 7/2002 | Iizuka et al. |
| 6,429,868 B1 | 8/2002 | Dehner, Jr. et al. |
| 6,442,545 B1 | 8/2002 | Feldman et al. |
| 6,446,110 B1 | 9/2002 | Lection et al. |
| 6,457,066 B1 | 9/2002 | Mein et al. |
| 6,480,882 B1 | 11/2002 | McAdam et al. |
| 6,489,954 B1 | 12/2002 | Powlette |
| 6,490,584 B2 | 12/2002 | Barrett et al. |
| 6,493,681 B1 | 12/2002 | Tertitski et al. |
| 6,510,406 B1 | 1/2003 | Marchisio |
| 6,516,303 B1 | 2/2003 | Wallman |
| 6,516,308 B1 | 2/2003 | Cohen |
| 6,523,022 B1 | 2/2003 | Hobbs |
| 6,556,987 B1 | 4/2003 | Brown et al. |
| 6,564,250 B1 | 5/2003 | Nguyen |
| 6,581,056 B1 | 6/2003 | Rao |
| 6,581,062 B1 | 6/2003 | Draper et al. |
| 6,598,028 B1 | 7/2003 | Sullivan et al. |
| 6,601,044 B1 | 7/2003 | Wallman |
| 6,611,825 B1 | 8/2003 | Billheimer et al. |
| 6,615,187 B1 | 9/2003 | Ashenmil et al. |
| 6,629,097 B1 | 9/2003 | Keith |
| 6,631,373 B1 | 10/2003 | Otani et al. |
| 6,633,868 B1 | 10/2003 | Min et al. |
| 2001/0011241 A1 | 8/2001 | Nemzow |
| 2001/0011242 A1 | 8/2001 | Allex et al. |
| 2001/0025264 A1 | 9/2001 | Deaddio et al. |
| 2001/0032217 A1 | 10/2001 | Huang |
| 2001/0034675 A1* | 10/2001 | Belford et al. ............ 705/30 |
| 2001/0042034 A1 | 11/2001 | Elliott |
| 2001/0043235 A1 | 11/2001 | Best et al. |
| 2001/0044771 A1 | 11/2001 | Usher et al. |
| 2001/0056398 A1 | 12/2001 | Scheirer |
| 2002/0002530 A1 | 1/2002 | May |
| 2002/0004777 A1 | 1/2002 | Foster et al. |
| 2002/0007335 A1 | 1/2002 | Millard et al. |
| 2002/0007358 A1 | 1/2002 | Johnson et al. |
| 2002/0013753 A1 | 1/2002 | Marks de Chabris et al. |
| 2002/0013862 A1 | 1/2002 | Orchard et al. |
| 2002/0016762 A1 | 2/2002 | Feilbogen et al. |
| 2002/0016819 A1 | 2/2002 | Sugimoto et al. |
| 2002/0018077 A1 | 2/2002 | Powlette |
| 2002/0022956 A1 | 2/2002 | Ukrainczyk et al. |
| 2002/0023053 A1 | 2/2002 | Szoc et al. |
| 2002/0026405 A1 | 2/2002 | Haar |
| 2002/0026449 A1 | 2/2002 | Azencott |
| 2002/0026462 A1 | 2/2002 | Shotton, Jr. et al. |
| 2002/0032644 A1 | 3/2002 | Corby et al. |
| 2002/0035561 A1 | 3/2002 | Archer et al. |
| 2002/0042767 A1 | 4/2002 | Kwan |
| 2002/0049666 A1 | 4/2002 | Reuter et al. |
| 2002/0054115 A1 | 5/2002 | Mack et al. |
| 2002/0059141 A1 | 5/2002 | Davies et al. |
| 2002/0065752 A1 | 5/2002 | Lewis |
| 2002/0065755 A1 | 5/2002 | Shlafman et al. |
| 2002/0069157 A1 | 6/2002 | Jordan |
| 2002/0073007 A1 | 6/2002 | Ayache |
| 2002/0078253 A1 | 6/2002 | Szondy et al. |
| 2002/0087373 A1 | 7/2002 | Dickstein et al. |
| 2002/0087454 A1 | 7/2002 | Calo et al. |
| 2002/0087455 A1 | 7/2002 | Tsagarakis et al. |
| 2002/0087457 A1 | 7/2002 | Madeley et al. |

(56) References Cited

U.S. PATENT DOCUMENTS

| | | |
|---|---|---|
| 2002/0099646 A1 | 7/2002 | Agarwal et al. |
| 2002/0099656 A1 | 7/2002 | Poh Wong |
| 2002/0112056 A1 | 8/2002 | Baldwin et al. |
| 2002/0123947 A1 | 9/2002 | Yuste et al. |
| 2002/0130868 A1 | 9/2002 | Smith |
| 2002/0138390 A1 | 9/2002 | May |
| 2002/0147671 A1 | 10/2002 | Sloan et al. |
| 2002/0152154 A1 | 10/2002 | Rothman et al. |
| 2002/0152156 A1 | 10/2002 | Tyson-Quah |
| 2002/0156658 A1 | 10/2002 | Selesny et al. |
| 2002/0161692 A1 | 10/2002 | Loh et al. |
| 2002/0161853 A1 | 10/2002 | Burak et al. |
| 2002/0169650 A1* | 11/2002 | Dougherty et al. ............... 705/8 |
| 2002/0169701 A1* | 11/2002 | Tarbox et al. .................. 705/36 |
| 2002/0169707 A1 | 11/2002 | Koek et al. |
| 2002/0174043 A1 | 11/2002 | Gilbert et al. |
| 2002/0178096 A1 | 11/2002 | Marshall |
| 2002/0184132 A1 | 12/2002 | Foster |
| 2002/0184237 A1 | 12/2002 | McFeely |
| 2002/0194097 A1 | 12/2002 | Reitz |
| 2002/0194114 A1 | 12/2002 | Erdmier |
| 2003/0004942 A1 | 1/2003 | Bird |
| 2003/0009411 A1 | 1/2003 | Ram et al. |
| 2003/0018714 A1 | 1/2003 | Mikhailov et al. |
| 2003/0033212 A1 | 2/2003 | Sandhu et al. |
| 2003/0037174 A1 | 2/2003 | Lavin et al. |
| 2003/0065594 A1 | 4/2003 | Murphy |
| 2003/0066025 A1 | 4/2003 | Garner et al. |
| 2003/0066032 A1 | 4/2003 | Ramachandran et al. |
| 2003/0078869 A1 | 4/2003 | Williams |
| 2003/0088496 A1 | 5/2003 | Piotrowski |
| 2003/0093360 A1 | 5/2003 | May |
| 2003/0093362 A1 | 5/2003 | Tupper et al. |
| 2003/0093565 A1 | 5/2003 | Berger et al. |
| 2003/0105981 A1 | 6/2003 | Miller et al. |
| 2003/0115122 A1 | 6/2003 | Slater et al. |
| 2003/0126063 A1 | 7/2003 | Reuter |
| 2003/0126068 A1 | 7/2003 | Hauk et al. |
| 2003/0126069 A1 | 7/2003 | Cha |
| 2003/0126117 A1 | 7/2003 | Megiddo et al. |
| 2003/0140035 A1 | 7/2003 | Burrows |
| 2003/0149653 A1 | 8/2003 | Penney |
| 2003/0154071 A1 | 8/2003 | Shreve |
| 2003/0158949 A1 | 8/2003 | Miller et al. |
| 2003/0188255 A1 | 10/2003 | Shimizu et al. |
| 2003/0220861 A1 | 11/2003 | Broms et al. |
| 2003/0220868 A1 | 11/2003 | May |
| 2003/0233459 A1 | 12/2003 | Miller et al. |
| 2003/0236862 A1 | 12/2003 | Miller et al. |
| 2003/0236957 A1 | 12/2003 | Miller et al. |
| 2004/0064397 A1 | 4/2004 | Lynn et al. |
| 2004/0078248 A1 | 4/2004 | Altschuler |
| 2004/0103003 A1 | 5/2004 | Mayers et al. |
| 2004/0148247 A1 | 7/2004 | Miller et al. |
| 2004/0162775 A1 | 8/2004 | Winklevoss et al. |
| 2005/0060256 A1 | 3/2005 | Peterson et al. |
| 2005/0086170 A1 | 4/2005 | Rao |

FOREIGN PATENT DOCUMENTS

| | | |
|---|---|---|
| WO | WO 01/37540 | 5/2001 |
| WO | WO 01/57716 | 8/2001 |
| WO | WO 01/59670 | 8/2001 |
| WO | WO 02/03774 | 1/2002 |
| WO | WO 02/14991 | 2/2002 |
| WO | WO 02/054189 | 7/2002 |
| WO | WO 02/056146 | 7/2002 |
| WO | WO 02/063516 | 8/2002 |
| WO | WO 02/065278 | 8/2002 |
| WO | WO 02/065286 | 8/2002 |
| WO | WO 03/012588 | 2/2003 |
| WO | WO 03/030013 | 4/2003 |
| WO | WO 03/032158 | 4/2003 |
| WO | WO 03/065256 | 8/2003 |
| WO | WO 03/102733 | 12/2003 |

OTHER PUBLICATIONS

Manco et al., A Framework for Adaptive Mail Classification, 14th IEEE Conference on Tools with Artificial Intelligence (ICTAI'02), Nov. 4, 2002, p. 387.
Silverman, A new strategy for giving away your money, Wall Street Journal, D1, Oct. 6, 2004.
Czejdo, Automatic generation ontology based anntations in XML and their use in retrieval systems, Web Information Systems Engineering, 2000, Proceedings of the First International Conference, Jun. 19, 2000, p. 296.
Novell, Inc., Beginning of Viewing Information and Viewing Basic Information about a print job.
Block Trades Market Practice, Apr. 1, 2003, pp. 1-10.
Chacko, Cephalon, Inc. Taking Risk Management Gherory Seriously.
Kus, Contingent capital: just in the capital management sets a new standard; Sponsored statement.
Electronic Trading Tools.
Martin, Email Report, Issue 11, Aug. 16, 2001, printed Aug. 2, 2005.
Fast Email Extractor 4.4.
Form 10-K, United States Securities and Exchange Commission, no date,year ending Dec. 31, 2003.
PILA, In Case of Emergency; contingent capital.
Intellseek and Inxight Partner to Provide New Business Intelligence Solutions, www.inxight.com/news/021029_intelliseek.html, Oct. 29, 2002.
Unknown, Investigating Systems.
May, Modeling and Querying Structure and Contents of the Web, 10th International Workshop on Database & Amp; Expert Systems Applications, Sep. 1, 1999, p. 721.
Rupali et al., Phrase-based Text Representation for Managing the Web Documents.
Lam et al., Querying Web Data—The WebQA Approach.
Rising to the challenge of global STP, Euromoney Publications PLC Global Inventor, Nov. 1, 1999, pp. 51-52; Issn. 0951-3604.
STP in the Bond Market?, Wall Street & Technology, Dec. 1, 2002, p. 20.
Ericson, Softwerc releases patent-pending.
IBM Corp., Strict Read Order Control for a Queing System.
Carchiolo et al., Structuring the Web.
Witten et al., Text Mining: A New Frontier for Lossless Compression.
Fan et al., The Internet and Future Financial Markets; Industry Trend or Event, Association for Computing Machinery, Inc., Sec. 11, vol. 43; Nov. 1, 2000, p. 82; Issn: 0001-0782.
Emery, et al., The Measurement of Liquidity, Journal of Accounting Research, vol. 20, No. 2, Part 1, p. 290-303, Autumn 1982.
Calado, The Web-DL Environment for Building Digital Libraries from the Web.
Ribiero-Neto et al., Top Down Extraction of Semi-Structured Data, String Processing and Information Retrieval Symposium & amp.
Roberts, Top Priority on Bottom Line: More Companies Seeting to Manage Business Risks.
TradeWeb's STP vision, Euromoney Institutional Investor PLC, Sec. 406, vol. 34, Feb. 1, 2003, p. S6; Issn: 0014-2433.
Elkayam, Using Indexed Bonds.
Myllymaki, With Standard XML Technologies.
Hewlett-Packard, x4queview.org.

* cited by examiner

Deal Documents > New Deal
Deal ID: 000

Client Specific Information

304 → CAS ID: 757410907
303 → Client Name: Pinnacle Cards
305 → Issuer Name:
310 → Project Name: Neptune

Deal Specifics

302 → Product: M&A
312 → Description:
311 → Sub Product:
313 → Keywords:

Deal Folder Definition

○ Deal Type
⊙ - Pre-defined -
○ Ad-Hoc

Coverage Information

308 Cov. Partner: Jeremy Kelly
306 Client Exec: Tracy Keays
309 Region Level 2: East
307 Industry Level 2: Household Products

Deal Team Assignment 301

| User | Rights |
|------|--------|
| Girardi | Full |

Team Members: Add

Default Groups

| Group | Rights |
|-------|--------|
| BRC | Full |
| PPS | Full |

Groups: Add

☐ Client Presentations
☐ Models
☐ Pitches

Edit Folder Definition

300 Main Deal Tab

Figure 3

400 Deal Folder Definition Tab

| Client Lookup | | * denotes required fields |
|---|---|---|
| | | |

Client Name / CAS ID  Bavarian Motor  [Lookup]

● Starts with    ○ Contains  (will slow down the search process)

☑ Find Parent Companies Only

☐ Manually Setup Client Name in Dealworks*

[▼] [▼] [▲] [▲]

[OK]    [Cancel]

*Manually setting up Client Name in Dealworks does not imply KYC or any JPMC legal authorization of the client

Figure 5A

| Client Lookup | | * denotes required fields |
|---|---|---|

Client Name / CAS ID   BMW          [ Lookup ]

○ Starts with        ● Contains  (will slow down the search process)

☑ Find Parent Companies Only

☐ Manually Setup Client Name in Dealworks*

[▼] [▼] [▲] [▲]

[ OK ]      [ Cancel ]

*Manually setting up Client Name in Dealworks does not include KYC or any JPMC legal authorization of the client

Figure 5B

Client Lookup

Client Name / CAS ID  BMW

○ Starts with   ● Contains (will slow down the search process)

[ Lookup ]

| Client Name | CAS ID | Issuer Name | Industry | Region | Client Exec. | Coverage Partner |
|---|---|---|---|---|---|---|
| BMW | XXXXX | XXXXX | XXXXX | XXXXX | XXXXX | XXXXX |
| BMWXXXX | XXXXX | XXXXX | XXXXX | XXXXX | XXXXX | XXXXX |
| BMWXXXXX | | | | | | |
| BMWXXXXXX | | | | | | |
| BMWXXXXXXX | | | | | | |

☑ Find Parent Companies Only
☐ Manually Setup Client Name in Dealworks*

[ OK ]   [ Cancel ]

*Manually setting up Client Name in Dealworks does not include KYC or any JPMC legal authorization of the client \* denotes require

Figure 5C

● JPMorganChase  Welcome...David Rapoport  [LOG OUT]

| Folder Setup | Conflicts Approval | Express Setup and Pipeline |

Primary Deal Information

> Conflicts in Progress > Proposed Setup and Pipeline > Close

804 → Primary Deal Contact
805 → Telephone Number [Select]
806 → Project Manager (if different)
807 → Telephone Number [Select]
808 → Project Name
809 → Status of the Deal
　　○ Pitch Non-Competitive　　○ Client Required
　　○ Pitch Competitive　　　　○ Mandate Offered　　○ Other (Describe)

810 → Note: Mandate cannot be accepted without contact's approval.
　　　 Competing Banks 811 → Transaction Type (Check all that apply)　　Consideration
　　☐ Buy Side Advisory　　☐ Acquisition Financing w/Advisory　　☐ Cash Consideration
　　☐ Set Side Advisory　　　　　　　　　　　　　　　　　　　　☐ Stock Consideration
　　☐ Merger of Equity　　*Select also from 1st column　　　　 ☐ Highly Leveraged
　　☐ JV
　　☐ Other Advisory (Deficiencies)
　　　　　　☐ Acquisition Financing ONLY　　　　　　　　　　　　☐ Cross Border
　　　　　　☐ Other Financing/Credit Financing
　　　　　　☐ Restructuring Financing 812 → Note: Cannot combine non-acquisition financing with advisory please submit separate templates
　　　 Summary of the Potential Assignment (e.g., "JPM Chase is pitching to advise A to acquire B...")

813 → Transaction Size (estimate/range, including premium and debt)
　　　$ 0 MM – $ 0 MM 814 → Related Business Opportunities
　　☐ Financing　　☐ Equity　　　　　☐ Private Banking
　　☐ FX　　　　　 ☐ Derivatives　　☐ Other (Describe)

[Close] 803　　[Save] 802　　[Submit] 801

Figure 8

● JPMorganChase     Welcome...David Rapoport     [LOG OUT]

| Folder | Conflicts | Express Setup and Pipeline |
|---|---|---|

> Expense Setup and Pipeline in Progress → Close

1001 *Project Name: Crayon
1002 Client:
1003 CAS ID:
1004 Product Area:
- ☒ MAA
- ☐ XXX
- ☐ XXX

1012 *JV (Casanova) Related?
○ Yes
◉ No

> Help test on Browser under *All JV related information must start with JV

Multi-product deals, where there is more than one mandate letter, must have one project set up for each area 1005 Project Leader:
1006 Client Executive:
1007 Team Members:
    JP Morgan:
    David Bluff (davidbluff@jpmorgan.com)
    Adam Bruce (adambruce@jpmorgan.com)
    Conrad Bandis (contradbandis@jpmorgan.com)
    Herbert Taylor (herberttaylor@jpmorgan.com)
    Add JP Morgan Casanova    Add 1008 *Project/Issue Description: _____ to Purchase RESCO 1009 *Project Status: ◉ Segment Merger    ○ Verified Amulsion    ○ Peak

Figure 10A

● JPMorganChase     Welcome...David Rapoport     [LOG OUT]

| Folder | Conflicts | Express Setup and Pipeline | Expense Setup and Pipeline in Progress | Close |

1013   If Executory Mandated, please provide copy of mandate letter/contractual documents to Advisory Billing 1014   Has transaction been reviewed by Commitments/Compliance?    ●Yes   ○No 1015   Has transaction been approved by Engagement Officer?    ●Yes   ○No 1010   Industry Group    Banking 1011   *Type of Deal
     ☑ Buy Side    Auditor?   ●Yes   ○No
     ☐ Fairness Operator    ☐ XXXXXX    Set Sale
     ☐ Validation    ☐ Strategic Advisory    Merger
     ☐ Defense    ☐ Other Pipeline Information 1016   Estimated size of deal ($$$$)    00
1017   Estimated gross fee ($000)    000
1018   Estimated completion date    January 2006
1019   Estimated percentage of success    00%

[Close]    [Save]    1020 [Submit]

Figure 10B

| ⊙ JPMorganChase | | | | | | | Session expires |
|---|---|---|---|---|---|---|---|
| | | | Welcome...David Rapoport | | | | [LOG OUT] |
| Manage My Dashboard | | | | Reset Tab Options \| Display Next 8 \| Display All \| Hide All | | | |
| IBM | Apple Computer | Hewlett Packard | Oracle | Microsoft | Computer Associates | Citrix | Tibco | TCW Group |
| Verizon | MCI | Apple Computer | Sun Microsystems | | DEA Systems | | Gateway | |

A|B|C|D|E|F|G|H|I|J|K|L|M|N|O|P|Q|R|S|T|U|V|W|X|Y|Z     NO MNM TO BE STORED IN CLIENT FOLDERS – USE DEAL FOLDERS

☐ M&G TRUST MGT AC XXXXX
☐ MM WARBURG & COMPANY NCAA HAMBURG
☐ MAAF ASSURANCES
☐ MACQUARIE BANK LTD LONDON
☐ MACQUARIE CAPITAL FUNDING (LP) PTV LIMITED
☐ MADISON DEARBORN PARIS LTD
☐ MAGYAR OLAJES GAZIPASIRIMAKO QCEU DERIVATIVES LIMITED ← 1104
☐ MALKA LIMITED
☐ MAN AKTIENGESELLSCHAFT
☐ MAN GROUP PLC
☐ MAN PROCOCTEN & OTTERDAM BV
☐ MANDO CORPORATION
☐ MANITOWIC EUROPE HOLDINGS LTD
☐ MANPOWER
☐ MAPFRE CASA MADRID HOLDINGS SA
☐ MAPFRE VIDA SA DE SEGUPOS Y PEASEGUROS
☐ MAPLE SECURITIES (US) LIMITED
☐ MAPLE SECURITIES (UK) LIMITED
☐ MAPRESS GMBH & CO KG
☐ MARCONI
☐ MARCONI PLC
☐ MARKETING STORE WORLDWIDE LLC
☐ MARKS & SPENCER PLC
☐ MARUEENI INTERNATIONAL FINANCE PLC
☐ MASHREQ BANK PSC
☐ MASS MUTUAL GLOBAL FUNDING
☐ MATAV CABLE SYSTEMS

| Credit | Admin | Client | Deal | Sector |
|---|---|---|---|---|

Figure 11B

| JPMorganChase | | | | | | Session expires at |
|---|---|---|---|---|---|---|
| Manage My Dashboard | | | | Welcome...David Rapoport | | [LOG OUT] |
| | | | | Reset Tab Options | Display Next 8 | Display All | Hide All | | |
| IBM | Apple Computer | Hewlett Packard | Oracle | Microsoft | DEA Systems | Malka Limited ← 1105 |
| Verizon | MCI | Sun Microsystems | Computer Associates | Citrix | Tibco | Gateway | TCW Group |

A|B|C|D|E|F|G|H|I|J|K|L|M|N|O|P|Q|R|S|T|U|V|W|X|Y|Z    NO MNM TO BE STORED IN CLIENT FOLDERS – USE DEAL FOLDERS

*i* cancel All

| Name | Session | Size | Checked out by | Modified |
|---|---|---|---|---|
| ☐ Annual Reports | 12.2 xxx | | | 24 XX- |
| +☐ DCM | 12.2 xxx | | | 24 XX+ |
| ☐ Models | 11.0 xxx | | | 34 XX+ |
| ☐ Business Models | 30.2 xxx | 42 KB | | 52 XX+ |
| ☐ Financial Models | 10.0 xxx | 174 KB | FATE | 20 XX- |
| ☐ Presentations | 10.0 xxx | | | 24 XX+ |
| ☐ Pricing Updates | 10.0 xxx | | | 24 XX+ |
| +☐ ECN | 12.0 xxx | 42 KB | | 20 XX+ |
| ☐ Models | 25.0 xxx | 174 KB | FATE | 24 XX+ |
| ☐ Presentations | 10.0 xxx | | | 24 XX+ |
| +☐ INCMM | 10.0 xxx | | | 24 XX+ |
| ☐ Models | 10.0 xxx | | | 24 XX+ |
| ☐ Presentations | 10.0 xxx | | | 24 XX+ |
| +☐ Letters & Memo | 10.0 xxx | | | 24 XX+ |
| ☐ 2005 | | | | |
| ☐ 2006 | | | | |

1107 → Show Deal Info | 1106 → Show Client Info | Credit | Admin | Client | Deal | Sector

Figure 11C

Client Specific Information — Coverage Confirmation

| Project Name | Product |
|---|---|
| ☐ Project Mail  1113 | Bond |
| ☐ Project Chimpanzee | Syndicated Loan |
| ☐ Project Life | Leveraged Buyout |
| ☐ Project Aqua | IPO |
| ☐ Project Wonderland | Management Buyout |

Add to Deal Dashboard
Add to Deal Dashboard Permanently

There are 6 project folders hidden from your view

1108

Client Specific Information

CASE ID: 75771063060
Client Name: Malka Limited
UCN 63696396130
SPN 86361000K44

Coverage Confirmation

Client Exec: Tracy Henderson
Parent Company: Malka Corporation
Industry: Petrochemicals
Sub-Industry: Oil & Gas
Co. Partner: William Gerard
Country of Rule: Algeria

1109

| Hide Deal Info | Hide Client Info | Admin | Credit | Client | Deal | Sector |

● JPMorganChase    Welcome...David Rapoport    Session expire [LOG OUT]

Manage My Dashboard    Reset Tab Options | Display Next 8 | Display All | Hide All

| Verizon | IBM | Apple Computer | MCI | Hewlett Packard | Sun Microsystems | Oracle | Computer Associates | Microsoft | DEA Systems | Tibco | Citrix | Maika Limited | Gateway | TCW Group |

A|B|C|D|E|F|G|H|I|J|K|L|M|N|O|P|Q|R|S|T|U|V|W|X|Y|Z    NO MNR TO BE STORED IN CLIENT FOLDERS – USE DEAL FOLDERS icancel All

| Name | Version Label | Size | Modified | Checked Out By | Created |
|---|---|---|---|---|---|
| ☐Annual Reports | 1.0,CURRENT | 4,948 KB | 01/05/2005 22:37:53 | | 11/02/2004 11:24:12 |
| +☐DCM | 1.0,CURRENT | 1,498 KB | 01/05/2005 22:37:53 | | 11/02/2004 11:23:53 |
| ☐Models | | | | | |
| ☐Business Models | 1.0,CURRENT | 786 KB | 01/05/2005 22:37:53 | | 11/02/2004 11:28:33 |
| ☐Financial Models | 1.0,CURRENT | 612 KB | 01/05/2005 22:37:41 | | 05/02/2004 16:03:43 |
| ☐Presentations | 1.0,CURRENT | 759 KB | 01/05/2005 22:37:53 | | 11/02/2004 11:25:29 |
| +☐ Amended and Restated Agen... | 1.0,CURRENT | 4,948 KB | 01/05/2005 22:37:53 | | 11/02/2004 11:24:12 |
| +☐ Amended and Restated Progr... | 1.0,CURRENT | 1,498 KB | 01/05/2005 22:37:53 | | 11/02/2004 11:23:53 |
| ☐ Master Global Notes | 1.0,CURRENT | 786 KB | 01/05/2005 22:37:53 | | 11/02/2004 11:28:33 |
| ☐ Offering Circular | 1.0,CURRENT | 612 KB | 01/05/2005 22:37:41 | | 05/02/2004 16:03:43 |
| ☐ Operating and Administrative... | 1.0,CURRENT | 759 KB | 01/05/2005 22:37:53 | | 11/02/2004 11:25:29 |
| ☑ Check In As New Document | 1.1,CURRENT | 24 KB | 13/07/2005 14:19:04 | 13/07/2005 14:19:04 | |
| E DCM Appraisals | 2.11,CURREN... | 14 KB | 11/10/2005 14:55:30 | | 11/10/2005 14:55:30 |
| E DCM Spreadsheet | 3.5,CURRENT... | 14 KB | 07/10/2005 15:35:40 | | 07/10/2005 15:35:40 |
| E DCM Spreadsheet 2 | 1.4,CURRENT | 14 KB | 13/07/2005 14:20:07 | | 13/07/2005 14:20:07 |
| E DCM Test | 1.1,CURRENT... | 8 KB | 21/07/2005 14:39:41 | | 21/07/2005 14:39:41 |
| H Documentum Presentation | 2.0,CURRENT | 23 KB | 24/06/2005 10:54:12 | | 24/06/2005 10:54:12 |
| H Documentum Webpage | 1.0,CURRENT | 3,324 KB | 23/06/2005 11:50:09 | | 23/06/2005 11:50:09 |
| ☐ JPM Annual Report | 1.0,CURRENT | 140 KB | 06/08/2005 15:52:33 | | 06/08/2005 15:52:33 |
| A MSAccessTest | 1.2,CURRENT | 4,948 KB | 26/07/2005 15:04:49 | | 26/07/2005 15:04:49 |
| ☐Pricing Updates | 1.0,CURRENT | | 01/05/2005 22:37:53 | | 11/02/2004 11:24:12 |
| +☐ECN | | | | | |
| ☐Models | 1.0,CURRENT | 1,498 KB | 01/05/2005 22:37:53 | | 11/02/2004 11:23:53 |
| ☐Presentations | 1.0,CURRENT | 798 KB | 01/05/2005 22:37:53 | | 11/02/2004 11:28:33 |
| +☐INCMM | 1.0,CURRENT | | | | |

↗ 1112

| Show Deal Info | Show Client Info | Credit | Admin | Client | Deal | Sector |

| Client Specific Information | | Coverage Confirmation | |
|---|---|---|---|
| CASE ID: | 75771063060 | Client Exec | Tracy Henderson |
| Client Name: | Malka Limited | Parent Company | Malka Corporation |
| UCN | 63696396130 | Industry | Petrochemicals |
| SPN | 86361000K44 | Sub-Industry | Oil & Gas |
| | | Co. Partner | William Gerard |
| | | Country of Rule | Algeria |

| Project Name | Product |
|---|---|
| ☑ Project Mail | Bond |
| ☑ Project Chimpanzee | Syndicated Loan |
| ☐ Project Life | Leveraged Buyout |
| ☐ Project Aqua | IPO |
| ☑ Project Wonderland | Management Buyout |

1123

Add to Deal Dashboard — 1124

Add to Deal Dashboard Permanently — 1125

There are 6 project folders hidden from your view

| Hide Deal Info | Hide Client Info | Credit | Admin | Client | Deal | Sector |

Figure 11I

| Document Type | DealWorks | Cardboard Archive Box | Not Applicable |
|---|---|---|---|
| ☐ Correspondence, memoranda, notes, work papers or computer models relevant to a material event (including material advice) decision or discussion | ☑ | ☑ | ☑ |
| ☐ Confidentiality Agreements<br>- between JPM and client or seller (if applicable)<br>- between client and sellers or prospective purchasers as applicable where JPM is Agent | ☑ | ☑ | ☑ |
| ☐ Engagement letter and addendums | ☑ | ☑ | ☑ |
| ☐ Indemnity agreement (if separate from Engagement letter) | ☑ | ☑ | ☑ |
| ☐ Information or offering memorandum | ☑ | ☑ | ☑ |
| ☐ List of potential buyers contacted | ☑ | ☑ | ☑ |
| ☐ Letters of intent and other preliminary agreements | ☑ | ☑ | ☑ |
| ☐ Selling documents | ☑ | ☑ | ☑ |
| ☐ Purchase and sale/merger agreement | ☑ | ☑ | ☑ |
| ☐ Fairness opinions – including related analyses and documentation | ☑ | ☑ | ☑ |
| ☐ Closing documents | ☑ | ☑ | ☑ |
| ☐ Amendments to the above<br>☐ Drafts of the above if they reflect advice JPM provided or if on the basis of these drafts advice was provided | ☑ | ☑ | ☑ |
| ☐ List of members of the project team | ☑ | ☑ | ☑ |
| ☐ Money Transfer Records (if applicable) | ☑ | ☑ | ☑ |
| ☐ Deposition Transcripts (if applicable) | ☑ | ☑ | ☑ |
| ☐ FSA, the Bank of England, the Take-Over Panel, the London Stock Exchange and other regulatory requests for information as well as the information provided | ☑ | ☑ | ☑ |
| ☐ Final presentations to the clients' Board of Directors or other pertinent presentations | ☑ | ☑ | ☑ |
| ☐ Records of access to confidential information for price-sensitive transactions | ☑ | ☑ | ☑ |
| ☐ Intralinks Dealspace CD (if applicable) | ☑ | ☑ | ☑ |
| ☐ Cardboard archive box Id . If used. (Separate multiple box Id's with a comma) | [ alphanumeric field] | | |

Figure 13

JPMorganChase

Session expires at 03:15

Welcome...David Rapoport [LOG OUT]

DEALWORKS DEAL CLOSURE PROCESS

Type of Closure | Select Folders | Mandatory Folders | Deal Closure Confirmation The following documents are checked out. If they are not checked in before clicking OK, the locks on these documents will be broken and the most recent version saved in Dealworks will be saved as the final version.

List of All Checked out Documents

| Document Name | Location/Subfolder Name | Checked Out By | Checked Out Date |
|---|---|---|---|
| Pricing Summary | Final Deal Documents – Loan | Abando Jan | 18/11/2005 |
| SVA | Credit Approvals | Ronnie Jose | 16/05/2005 |

Cancel | OK

Figure 14

SYSTEMS AND METHODS FOR INTEGRATING A DEAL PROCESS

FIELD OF THE INVENTION

The present invention relates to a system which integrates a whole deal process including creation of a deal, conflicts approval, expense tracking, and deal closure in a financial institution.

BACKGROUND OF THE INVENTION

A financial institution (e.g., a large bank) offers various financial services to clients. These services include: merger and acquisition (i.e., doing financial restructuring such as helping clients buy companies, merge with companies, and sell or spin off divisions into new companies), equity capital market (i.e., issuing equity such as Initial Public Offering (IPOs), Follow-ons, and private placements into the capital markets), debt capital market (i.e., issuing varying types of debt such as bonds, loans, and leveraged finance into the capital market, and global credit risk management (i.e., managing the credit risk of a bank with respect to outstanding credit (loans leveraged) to its clients). These services are called deals.

During the whole lifecycle of a deal, it will go through the following steps: deal setup, conflicts approval, analyzing, making a deal including pitching, winning, executing and closing mandates, expense tracking, and deal closure.

Current technology doesn't offer an unified and integrated way for a whole deal lifecycle. For example, in an acquisition deal, acquisition and raising capital are separate processes instead of one, which is inefficient. In addition, different information for a deal is controlled by different deal-related departments, which results in multiple and repetitive work during a deal process. Furthermore, no mechanism exists, which integrates all deals and processes into one platform on which users can access different classes of secured financial information in real-time by means of an multi-layer user interface with high navigation ability. Hence, there is a need to establish such a system for integrating the whole lifecycle of deals.

SUMMARY OF THE INVENTION

This invention is directed to a system in which a deal team member in a financial institution can access different classes of secured financial information in real-time by means of an multi-layer user interface with high navigation ability, and the financial institution can provide categorized reporting information.

The invention consists of three main components. The first one is a flexible user interface with high navigation ability. The user has an ability to create a project record for a deal. This process will begin with definition of the deal. A deal workspace is automatically created when a new deal record is created by the user. The deal workspace refers to a folder structure that is created to securely store and share documents related to the deal. The client can view, manage, and edit deal properties. The user can also delete a deal, Credit Files and Compliance (CFAC), administration, or sector security folder.

The second one is that the user can access secured multi-layer information flow in real time, e.g., loan, bond, or leveraged finance deal. In the early stages of the deal, the user sets up the deal workspace for storage of deal related documents. As the deal becomes a formal pitch, e.g., on Request for Proposal (RFP), receipt of Material Non-public Information (MNPI) or verbal mandate, the user contacts Conflicts Office to obtain approval. The user can view historic versions of a file and associated attribute information.

The third one is that the financial institution can get the whole deal lifecycle so that the financial institution knows who has been involved in a deal, where the deal is, how much the incurred and potential fees are from the deal, and provides reports with classified information. The deal related expenses are centrally tracked using the project name and subsequently reimbursed by the client related to the project. The expense recovery and reporting system (FA-MIS) is used to set up client related projects.

The above and other objects and features of the present invention will be apparent in the following detailed description of the present invention when read in conjunction with the accompanying drawings.

BRIEF DESCRIPTION OF THE DRAWINGS

In order to facilitate a fuller understanding of the present invention, reference is now made to the accompanying drawings. These drawings should not be construed as limiting the present disclosure, but are intended to be exemplary only.

FIG. 3 is a diagram illustrating how to use a Main Deal tab to create a new deal in accordance with one embodiment of the present invention.

FIG. 5 is a diagram illustrating how to search a client name in accordance with one embodiment of the present invention.

FIG. 8 is a diagram illustrating a Conflicts tab for Financing and Advisory sub product in accordance with one embodiment of the present invention.

FIGS. 10A-B are diagrams illustrating how to set up an expense tracking pipeline for merger and acquisition (M&A) as an exemplary embodiment in accordance with one embodiment of the present invention.

FIGS. 11A-I are diagrams illustrating some exemplary navigation functions of the Dealworks system in accordance with one embodiment of the present invention.

FIG. 13 is a diagram illustrating a list of deal-related files in a deal folder for closure in accordance with one embodiment of the present invention.

FIG. 14 is a diagram illustrating a deal closure confirmation screen in accordance with one embodiment of the present invention.

DETAILED DESCRIPTION OF THE INVENTION

Figure 1A:
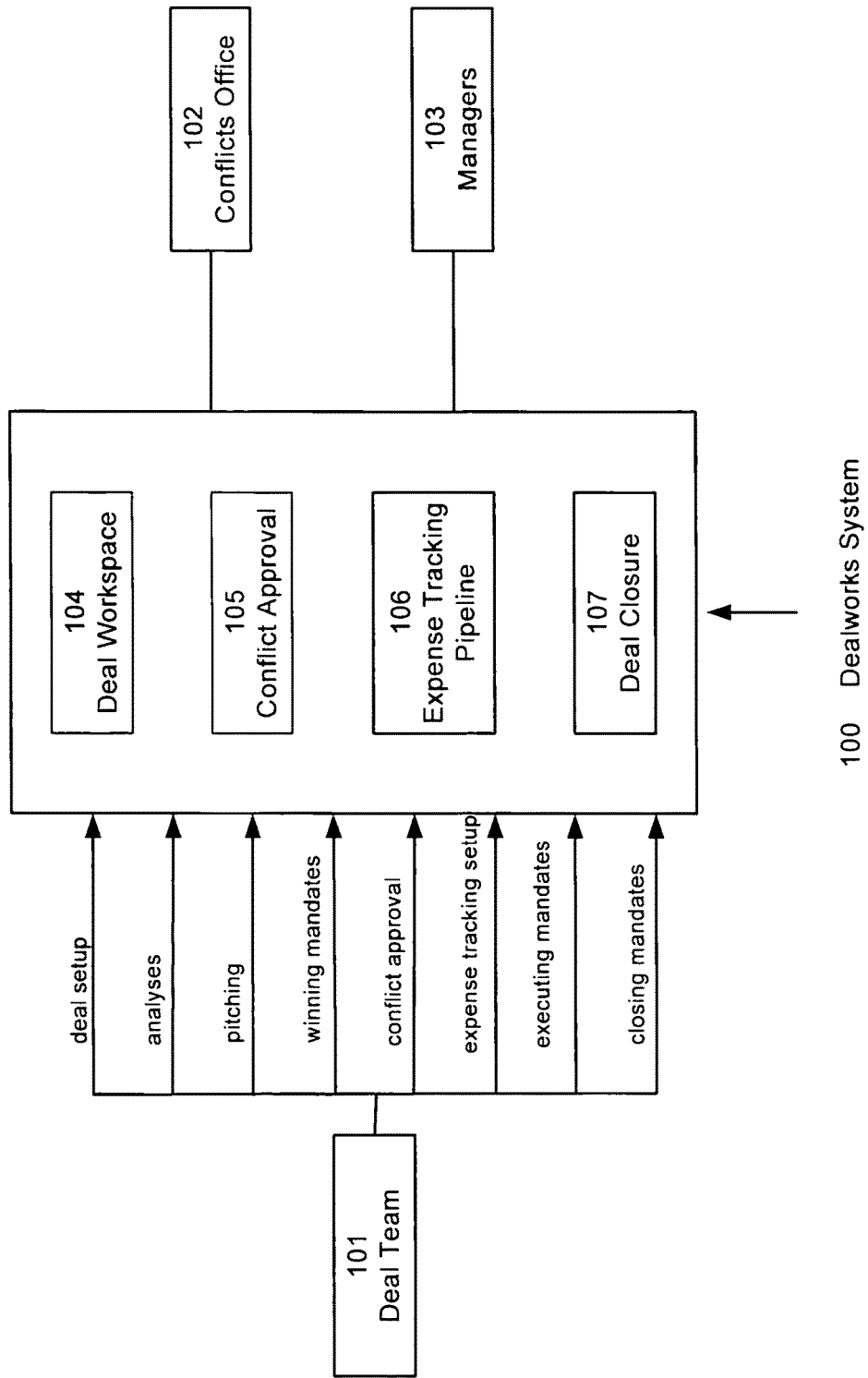
FIGS. 1A-C are block diagrams illustrating a Dealworks system in accordance with embodiments of the present invention.

FIG. 1A is a block diagram illustrating a Dealworks system 100 in accordance with one embodiment of the present invention. The Dealworks system is an engine which executes and integrates the whole lifecycle of a deal via computer and interacting with a deal team 101 and other functional entities such as Conflicts Office 102 and business managers 103. The deal team is a functional group which comprises personnel of a financial institution and carries out the deal, including setting up a deal, analyzing, pitching, winning, executing, and closing mandates. The Dealworks system comprises a deal workspace 104, a conflicts approval module 105, an expense tracking pipeline 106, and a deal closure module 107. The deal workspace is a folder structure that is created to securely store and share documents related to a deal. The conflicts approval module is used to initiate a conflicts approval process as the deal becomes a formal pitch, and interact with the Conflicts Office to carry out an approval requirement. The expense tracking pipeline is a functional module of the Dealworks system, which is used to track expenses occurring during a deal lifecycle, and is set up after submitting the conflicts form. The financial institution receives reports with classified information via this module such as who has been involved in a deal, and how much the incurred and potential fees are from the deal. The deal closure module is used to close a deal which achieved mandate status. The deal closure is a both legal and financial process, which makes documentation for that deal as well as potentially makes the information reusuable to appropriate clients.

Figure 1B:
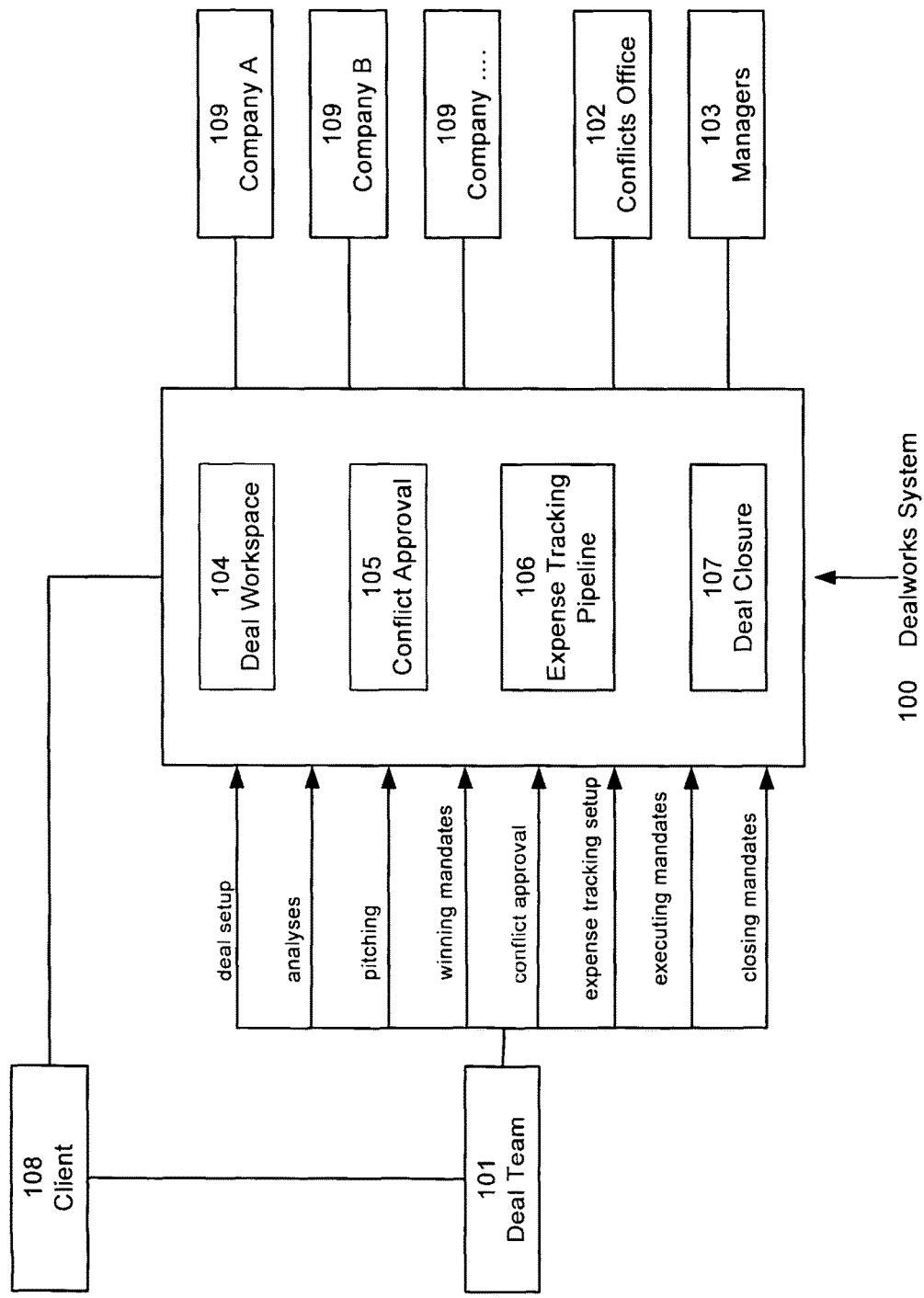

FIG. 1B is a block diagram illustrating a Dealworks system 100 in accordance with another embodiment of the present invention. In this embodiment, the Dealworks system 100 is configured so that an interface between a client 108 and the Dealworks system is added. The client can access that particular deal's documents in the deal workspace to directly involve and control the whole deal process. In addition, a company which is involved in a deal (e.g., in a merger and acquisition deal, the company which is purchased) 109 can also access the Dealworks system.

Figure 1C:
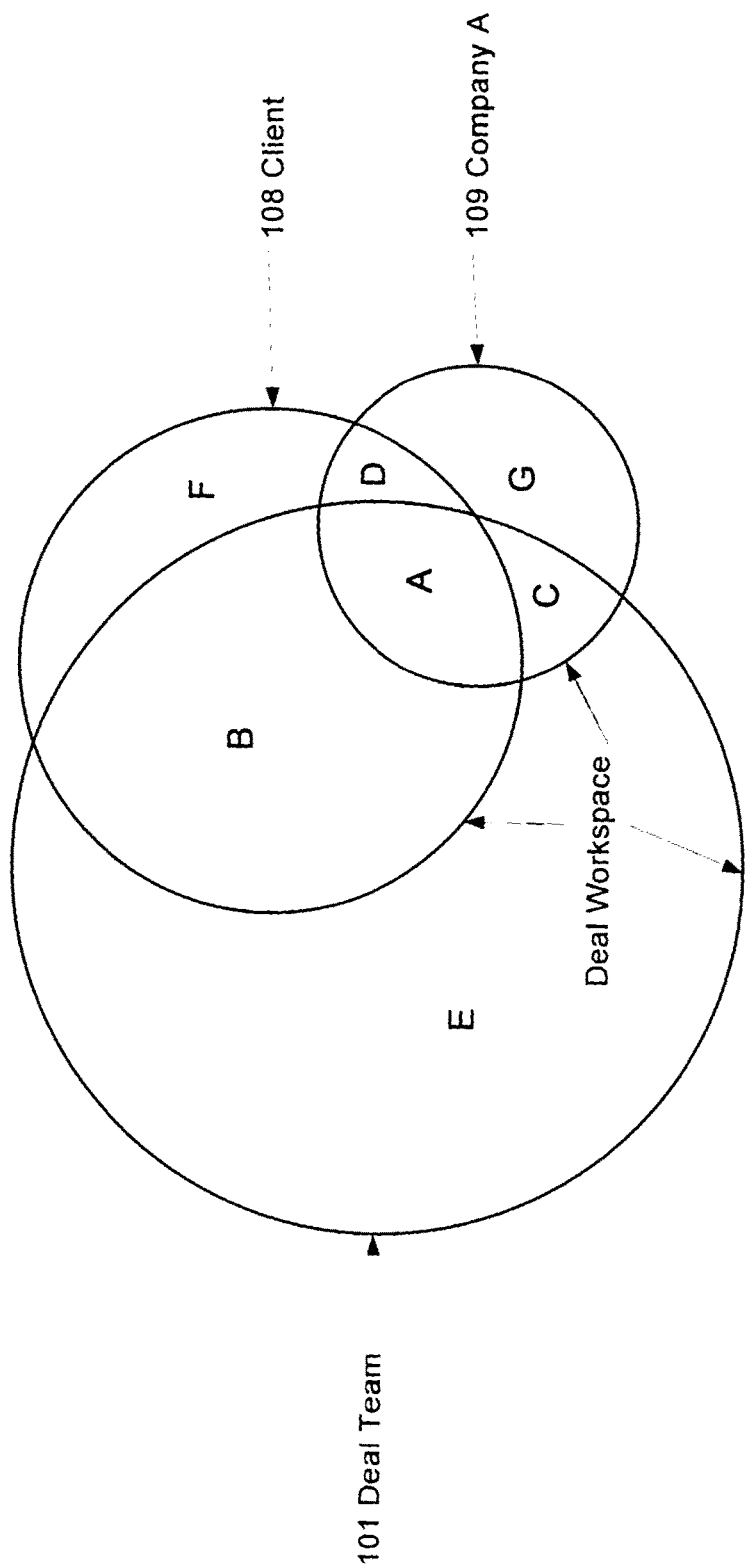

Although the deal team, the client, and the deal-related company are all allowed to access the workspace via the Dealworks system as a platform during the deal, each one can only access its corresponding part of the workspace, which can be illustrated by a concept "security bubble" as shown in FIG. 1C. If the area enclosed by these circles is taken as the whole workspace of a deal, the deal team 101 can only access the part A+B+C+E of the workspace, the client 108 can only access the part A+B+D+F of the workspace, and the deal-involved company A 109 can only access the part A+C+D+G of the workspace. The domains in the workspace which all the deal team, the client, and the deal-involved company A are clearly defined and secured. For some deal-related documents of the workspace (e.g., part E), only the deal team can access (e.g., deal-related expense revenue from the client). Likewise, for other documents of the workspace, only the client or the deal-involved company A can access (e.g., part F and part G respectively).

For some documents of the workspace (e.g., part A), the deal team, the client, and the deal-involved company A can all access (e.g., the final legal documents of the deal). For some documents of the workspace (e.g., B), only the deal team and the client can access (e.g., deal analysis documents).

Figure 2:
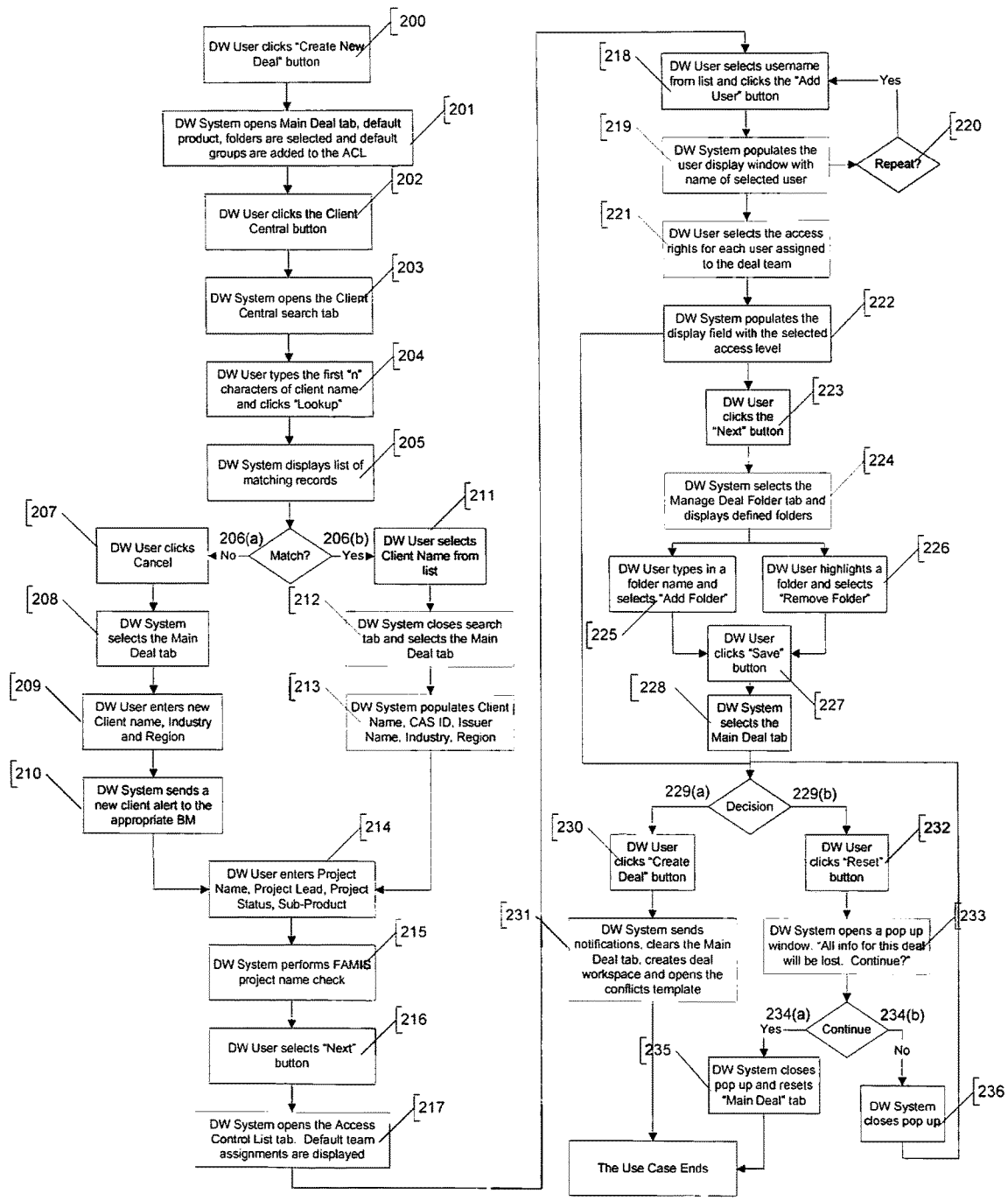
FIG. 2 is a flowchart showing a process of creating a deal workspace for a new deal via a computer interface by a Dealworks user in accordance with one embodiment of the present invention.
Figure 4:
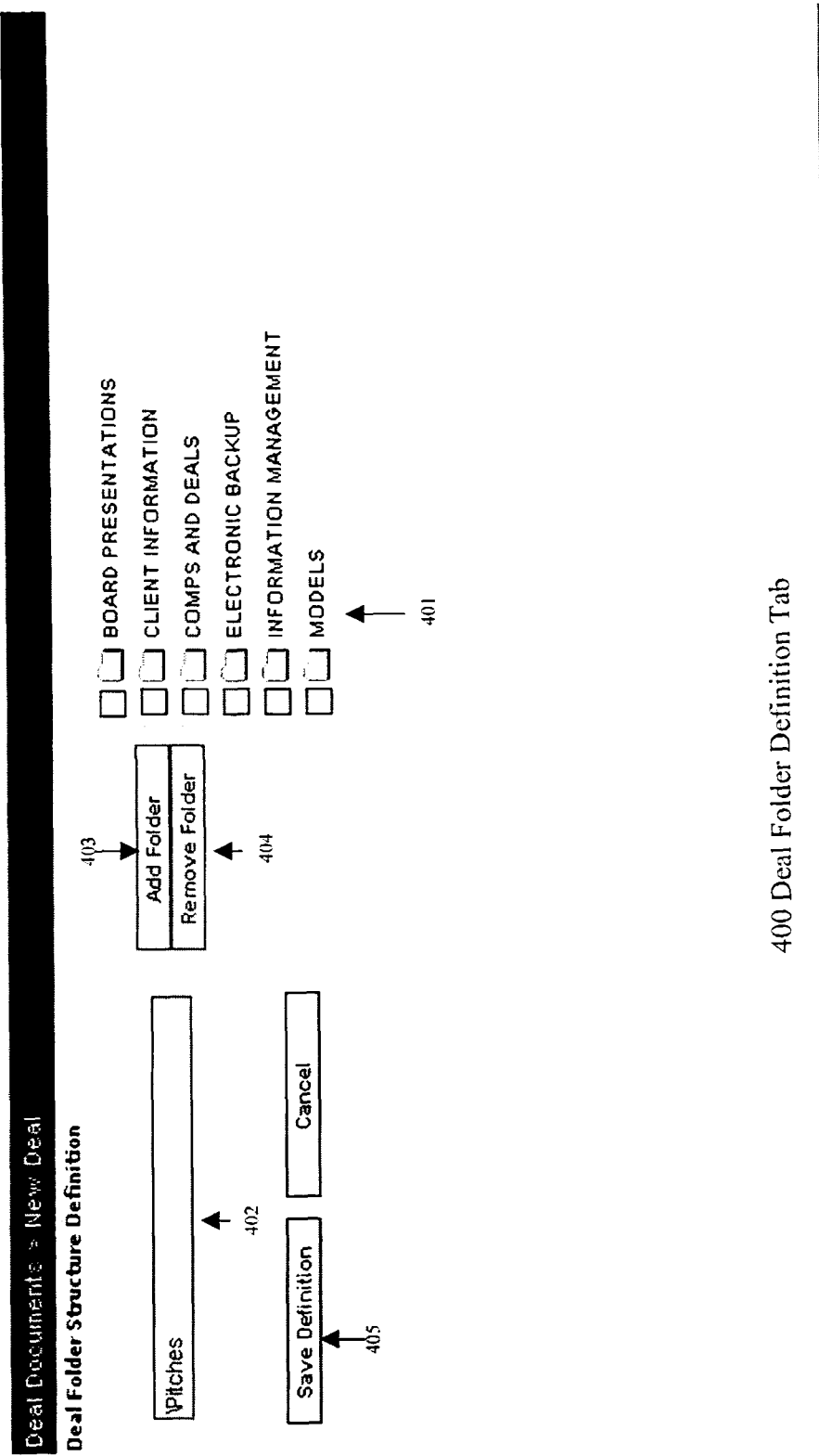
FIG. 4 is a diagram illustrating how to use a Main Deal tab to define deal folders in accordance with one embodiment of the present invention.
Figure 6:
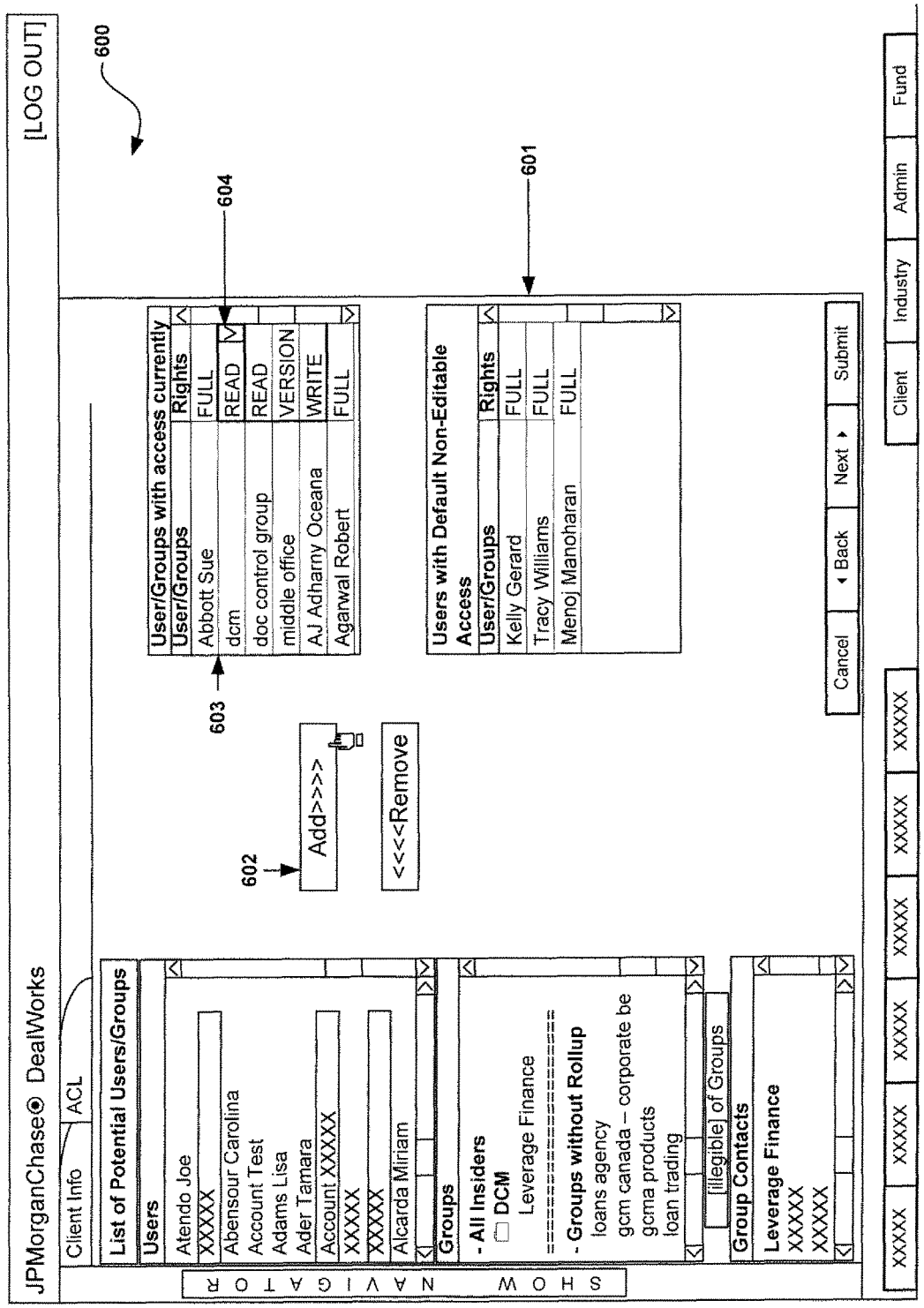
FIG. 6 is a diagram illustrating how to add users to the Dealworks system and set their access rights in an Access Control List (ACL) tab in accordance with one embodiment of the present invention.

As the first step of a deal lifecycle, a user of a Dealworks system (hereafter called "DW user") needs to create a project record for the deal with the Dealworks system. This process will begin with definition of the deal within the Dealworks system. A deal workspace is automatically created when a new Deal Record is created by the DW user. The Deal Workspace refers to a folder structure that is created in the DW system to securely store and share documents related to the deal. FIG. 2 is a flowchart showing a process of creating a deal workspace for a new deal via a computer interface by a DW user in accordance with one embodiment of the present invention. FIG. 3 is a diagram illustrating how to use a Main Deal tab to create a new deal in accordance with one embodiment of the present invention. FIG. 4 is a diagram illustrating how to use a Main Deal tab to define deal folders in accordance with one embodiment of the present invention. FIG. 5 is a diagram illustrating how to search a client name in accordance with one embodiment of the present invention. FIG. 6 is a diagram illustrating how to add DW users and set their access rights in an Access Control List (ACL) tab in accordance with one embodiment of the present invention. The process of FIG. 2 is described in connection with FIGS. 3, 4, 5, and 6 in order to set forth the process in a concrete fashion easily understood by the person of ordinary skills. However, this articulation of the process is exemplary only, and the process could be implemented differently from those of FIGS. 3, 4, 5, and 6.

As set forth in FIG. 2, a DW user clicks on the "Create New Deal" button from a DW workspace 200. The DW system opens a Main Deal tab, an empty form for entering deal information 201 (also 300 as shown in FIGS. 3 and 400 in FIG. 4). The DW user appears in the "Deal Team Assignments" display window 301 as shown in FIG. 3. The default folders for the DW user 401 are listed in the Deal Folder Definition Tab 400 as shown in FIG. 4. The default product for the DW user is pre-selected for each user, which could be Merger and Acquisitions (M&A), Equity Capital Markets (ECM), Debt Capital Markets (DCM), or Global Credit Risk Management (GCRM) 302 as shown in FIG. 3. The DW user clicks on the Client Name search button to select a client 202 (also 303 as shown in FIG. 3). The DW system opens the Client Center Search Tab 203 (also as shown in FIG. 5). The DW user enters the first "n" letters of the client name and clicks "Lookup" 204 (also as shown in FIGS. 5A, 5B). The DW system displays a list of matching records 205 (also as shown in FIG. 5C). If the client does not exist in the Client Central 206(*a*), the DW user closes the Client Center Search Tab 207 and the DW system returns to the Main Deal Tab 208. The DW user enters new client name, industry and region information 209. The DW system then sends a new client alert to an appropriate business manager 210 (also 303-309 as shown in FIG. 3). If the client exists in Client Central 206(*b*), the DW user selects its client name from the list 211. The DW system closes the search tab and returns to the Main Deal Tab 212. The DW system automatically populates the client name, CAS ID, issuer name, industry, and region information 213 (also 303-309 as shown in FIG. 3). The DW user then enters deal specific information such as project name, product (i.e., M&A, ECM, DCM, or GRCM), sub-product (i.e., for M&A. Advisory, Acquisitions, Mergers, Leveraged Buy Out (LBOs), Fairness, Sellside, Defense, or Equity Private Placements (EPP); for ECM, Initial Public Offering (IPO), Rights Issue, Equity Linked, ABBs, or Follow On; for DCA Bonds, Loans. Loans/Bonds, Multilateral Trade Negotiation (MTN) Prog, MTN Trades, Bond Participation Only, Structured Finance, or Transaction and Execution Group (TEG Other); for GRCM, Bi Lats (i.e., non-syndicated loans), or TSS-Cash (i.e., treasure services)), description, and keywords 214 (also 302, 310, 311, 312, and 313 as shown in FIG. 3).

To add deal users, the DW user opens the Access Control List tab 217 (also 600 as shown in FIG. 6). The default team assignments are displayed 601 as shown in FIG. 6. The DW user selects a user name and clicks the "Add" button 218 (also 602 as shown in FIG. 6). The DW system populates the user display window with name of selected user 219 (also 603 as shown in FIG. 6). For adding multiple users, this step is repeated as necessary 220. For each user, the DW user selects an access right (i.e., full, write, version, or read) 221 (also 604 as shown in FIG. 6). The DW system populates the display with the selected access level 222.

To add or remove deal folders, the DW system goes to the Deal Folder Definition tab 224 (as shown in FIG. 4). To add a deal folder, the DW user types in the name of a folder and clicks on the "Add Folder" button 224 (also 402 and 403 as shown in FIG. 4). To remove a deal folder, the DW user highlight a folder name in the folder display list and clicks on the "Remove Folder" button 226 (also 404 as shown in FIG. 4). The DW user then clicks the "Save" button 227 (also 405 as shown in FIG. 4).

Once finishing these steps, the DW system returns to the Main Deal tab 228. If the DW user decides to create a deal 229(*a*), he clicks "Create Deal" button 230. The DW system sends notifications, clears the Main Deal tab, creates a deal workspace, and opens a conflicts template 231. If the DW user decides to reset the settings 229(*b*), he clicks "Reset" button 232. The DW system opens a pop-up window to confirm 233. If the user decides to proceed 234(*a*), the DW system closes the pop-up and resets the Main Deal tab 235. If the user decides not to proceed 234(*b*), the DW system closes the pop-up 236.

Figure 7:
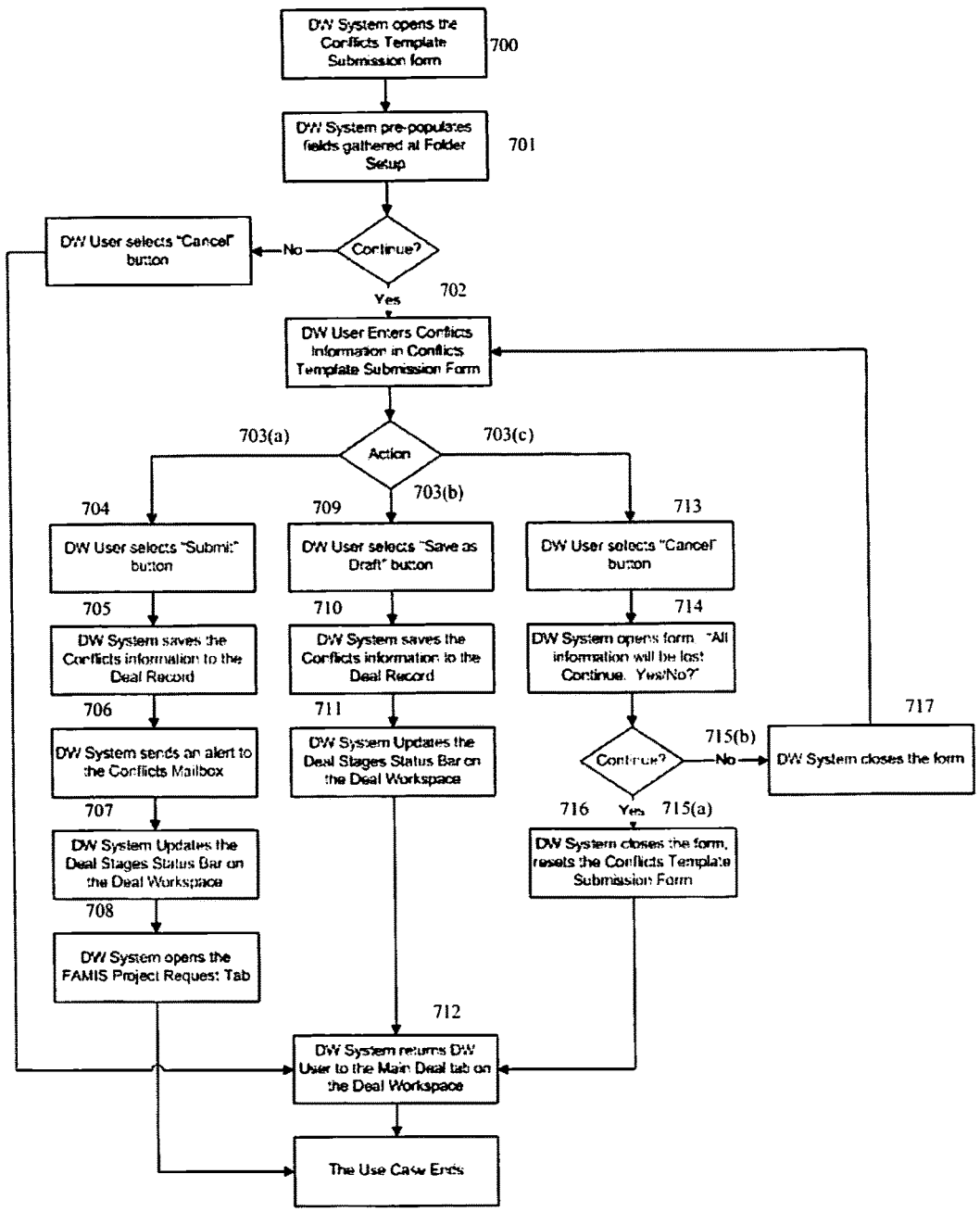
FIG. 7 is a flowchart showing how a user of the Dealworks system submits a conflict approval request in accordance with one embodiment of the present invention.

As the deal becomes a formal pitch (i.e., winning the sale of a product to a client), the DW user contacts the Conflicts Office to obtain approval. FIG. 7 is a flowchart showing how a DW user submits a conflicts approval request in accordance with one embodiment of the present invention. FIG. 8 is a diagram illustrating a Conflicts tab for Financing and Advisory sub product as an exemplary embodiment in accordance with one embodiment of the present invention. The process of FIG. 7 is described in connection with FIG. 8 in order to set forth the process in a concrete fashion easily understood by the person of ordinary skills. However, this articulation of the process is exemplary only, and the process could be implemented differently from those of FIG. 8.

As set forth in FIG. 7, the DW system opens the Conflicts tab with an appropriate template form selected for the sub product entered during the folder setup 700 (also 800 as shown in FIG. 8). The DW system pre-populates the fields (i.e., primary deal contact, primary deal contact telephone number, project name, transaction type, client full name, client executive, exchange, description of business, industry, access control list) with information gathered at the folder setup 701. The DW user enters conflicts information into the Conflicts tab 702. If the user decides to proceed 703(*a*), he selects "Submit" button 704 (also 801 as shown in FIG. 8). The DW system saves the conflicts information to the deal record 705. The DW system sends an alert to a conflicts mailbox and forwards the conflicts approval record for approval 706. The DW system updates the deal stage status bar on the deal workspace 707. The DW system opens the Expense Tracking Pipeline tab to set up the project for expense tracking-related purposes 708. If the DW user doesn't want to submit the form 703(*b*), he may selects "Save as Draft" 709 (also 802 as shown in FIG. 8). The DW system saves the conflicts information to the deal record 710. The DW system updates the deal stage status bar on the deal workspace 711 and returns to the Main Deal tab 712. If the DW user doesn't want to submit the form 703(*c*), he may also select "Cancel" button 713 (also 803 as shown in FIG. 8). The DW system opens a pop-up asking "All information will be lost. Continue?" 714. If the DW user selects "continue" 715(*a*), the DW system resets the Conflicts Template Submission Form 716 and returns to the Main Deal tab 712. Otherwise 715(*b*), the DW system closes the form 717.

The Conflicts tab for Financing and advisory sub product is used for conflicts approval if the sub-product belongs to one of the following sub-products: Advisory, Buyside-Acquisitions, Buyside-Mergers. Buyside-LBOs, Buyside-Fairness Opinion, Seilside, Defense, EPP, DCM Bonds, DCM Loans, Leveraged Finance, and Structured Finance. The DW system selects the Conflicts Equities Template Submission tab for the sub-products: IPO, Right Issue, Equity Linked, ABB. Follow On, and Block Trade. The DW system skips the Conflicts Submission phase if the following sub-products are selected at folder setup: MTN Program, MTN Trade, Bi Lats, TEG Other, and Bond Participation. As an exemplary embodiment, the fields of the Conflicts tab for Financing and advisory sub product are listed below.

1. Primary Deal Contact 804
    2. Primary Deal Contact telephone number 805
    3. Project Manager (if different) 806
    4. Project Manager telephone number 807
    5. Project Name 808
    6. Status of the Deal 809
    6a. Status of the Deal—Other:
    7. Competing Banks 810
    8. Transaction Type 811
    8a. Transaction Type—Other Advisory:
    9. Summary of the Potential Assignment 812
    10. Transaction Size 813
    11. Related Business Opportunities 814
    11a. Related Business Opportunities—Other:
Client:
    12. Full Name
    13. Role
    14. Client Exec
    15. Description of Business
    16. Public or Private
    17. Ticker Symbol
    18. Exchange
    19. Industry
    20. Revenues
    21. Market Cap
    22. Firm Value
    23. EBITDA
    24. Parent or Major Share Holders
    25. JPM Relationship
    26. Approving MD(s) if new client
    27. Subsidiary/Division/Assets involved if subject of the transaction is not the entire company
    28. Any other interested Parties Names, Roles
Conflicts and Issues
    29. Other important background
    30. Possibility of turning hostile 31. If deal is non-acquisition related credit facility/financing, indicate: purpose, agent bank, amount of JPM commitment.

32. If deal is credit facility amendment, indicate: agent bank, covenants changes, increase/decrease in facility amount, maturity extension, whether "troubled" credit.

33. Is the deal team aware of any potential conflicts or any other issues?

34. Describe:

35. Which senior managers have confirmed that there are globally no conflicts or other issues—including any "best horse'/foregone opportunities issues, relationship risks with other clients, or other reputation risks to the firm?

36. Confirming IB Coverage Head

37. Confirming M&A Sector Head

38. Other confirming Senior Managers

39. Deal Team Members

40. Has anyone on the team worked with the target?

41. Are there any board seats held by JPM Chase employees?

42. Has JPM signed a confidentiality agreement?

43. Is a standstill agreement or any exclusivity language proposed?

44. Has JPM received material, non-public information?

45. Other information for Conflicts Office

46. If deal team has fee level(s) to propose to Engagements—Press Here

47. Retainer Fee

48. Upfront Fee

49. Success Fee

50. Opinion Letter

Figure 9:
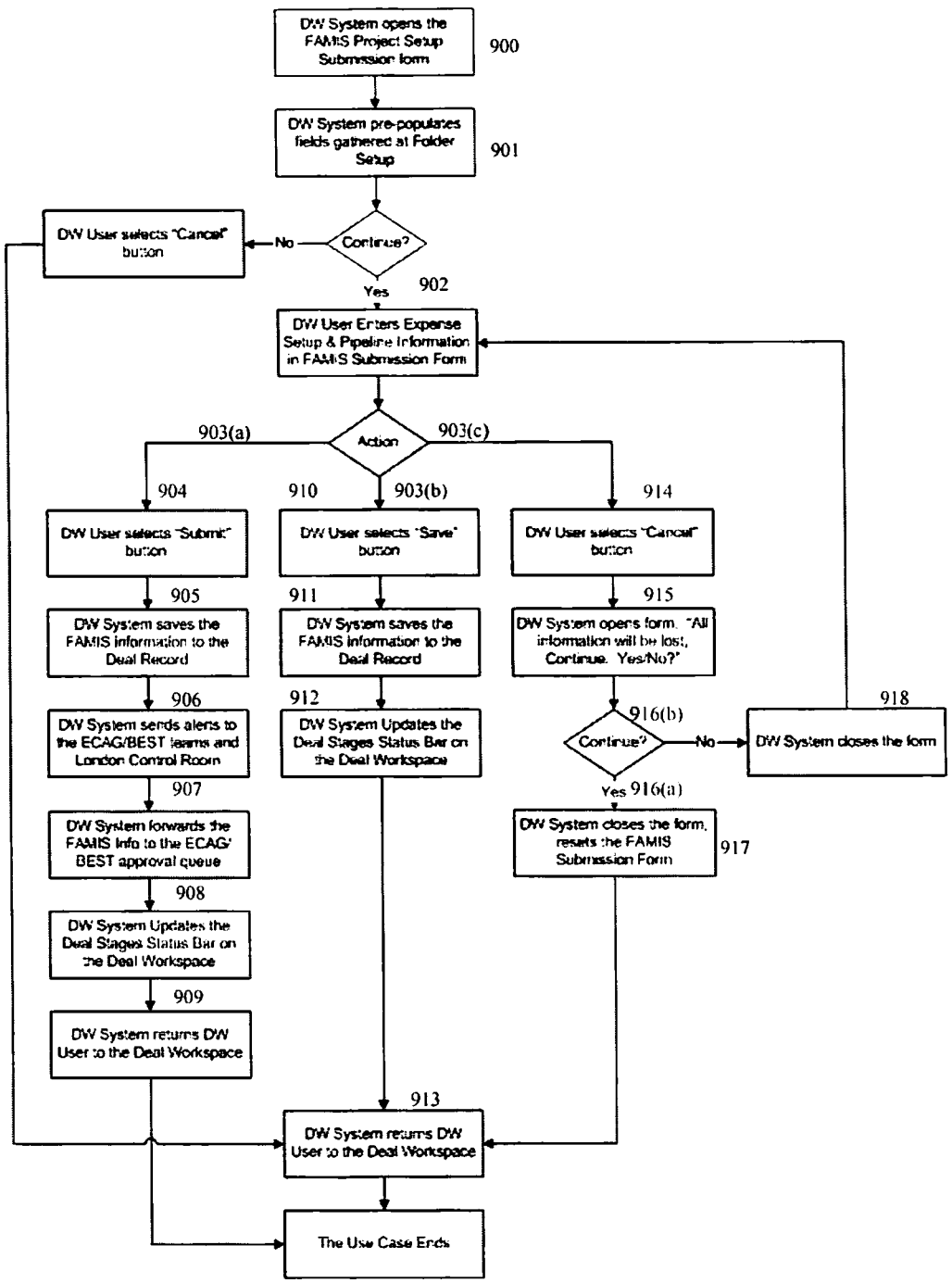
FIG. 9 is a flowchart showing how to set up an expense tracking pipeline in accordance with one embodiment of the present invention.

After submitting the Conflicts tab, an expense tracking pipeline for the deal is set up so that the deal related expenses are centrally tracked using the project name and subsequently reimbursed by the client related to the project. FIG. 9 is a flowchart showing how to set up the expense tracking pipeline in accordance with one embodiment of the present invention. FIGS. 10A and 10B are diagrams illustrating how to set up the expense tracking pipeline for merger and acquisition (M&A) as an exemplary embodiment in accordance with one embodiment of the present invention. The process of FIG. 9 is described in connection with FIGS. 10A-B in order to set forth the process in a concrete fashion easily understood by the person of ordinary skills. However, this articulation of the process is exemplary only, and the process could be implemented differently from those of FIGS. 10A-B.

As set forth in FIG. 9, the DW system opens the Expense Setup and Pipeline tab with an appropriate request form selected for the DW user 900 (also 1000 as shown in FIGS. 10A-B). If the sub product selected does not require expense setup, the DW system bypasses this stage and returns to the deal workspace. The DW system pre-populates the fields with the information previously entered at the folder setup and the conflicts stages 901 (e.g., client address, client executive, client CAS ID, client full name, access control list, product area, project/issue description, project leader, project name, project status, and type of deal 1001-1011 as shown in FIGS. 10A-B). The DW user enters the mandatory fields and updates the fields if necessary (e.g., JV Related, Project Name, Access Control List, Project Status, and Industry Group 1012-1015, 1001, 1007, 1009, and 1010 as shown in FIGS. 10A-B). The DW user also enters the pipeline information 902 (e.g., estimated size of deal, estimated gross fee, estimated completion date, and estimated percentage of success 1016-1019 as shown in FIG. 10B). If the DW user decides to proceed 903(a), he selects "Submit" button 904 (also 1020 as shown in FIG. 10B). The DW system saves the information to the deal record 905. The DW system sends alerts to the ECAG/BEST teams and London Control Room 906. The DW system forwards the information to the ECAG/BEST approval queue 907. The DW system updates the status bar on the deal workspace 908. The DW system returns to the deal workspace 909. If the DW user does not want to proceed 903(b), he may select "Save" button 910. The DW system saves the information to the deal record 911. The DW system updates the status bar on the deal workspace 912. The DW system returns to the deal workspace 913. If the DW user does not want to proceed 903(c), he may also select "Cancel" button 914. The DW system opens a pop-up asking "All information will be lost. Continue. Yes/No?" 915. If the DW user clicks "Yes" 916(a), the DW system closes the form, resets the form 917, and returns to the deal workspace 913. If the DW user clicks "No" 916(b), the DW system closes the form.

Figure 11A:
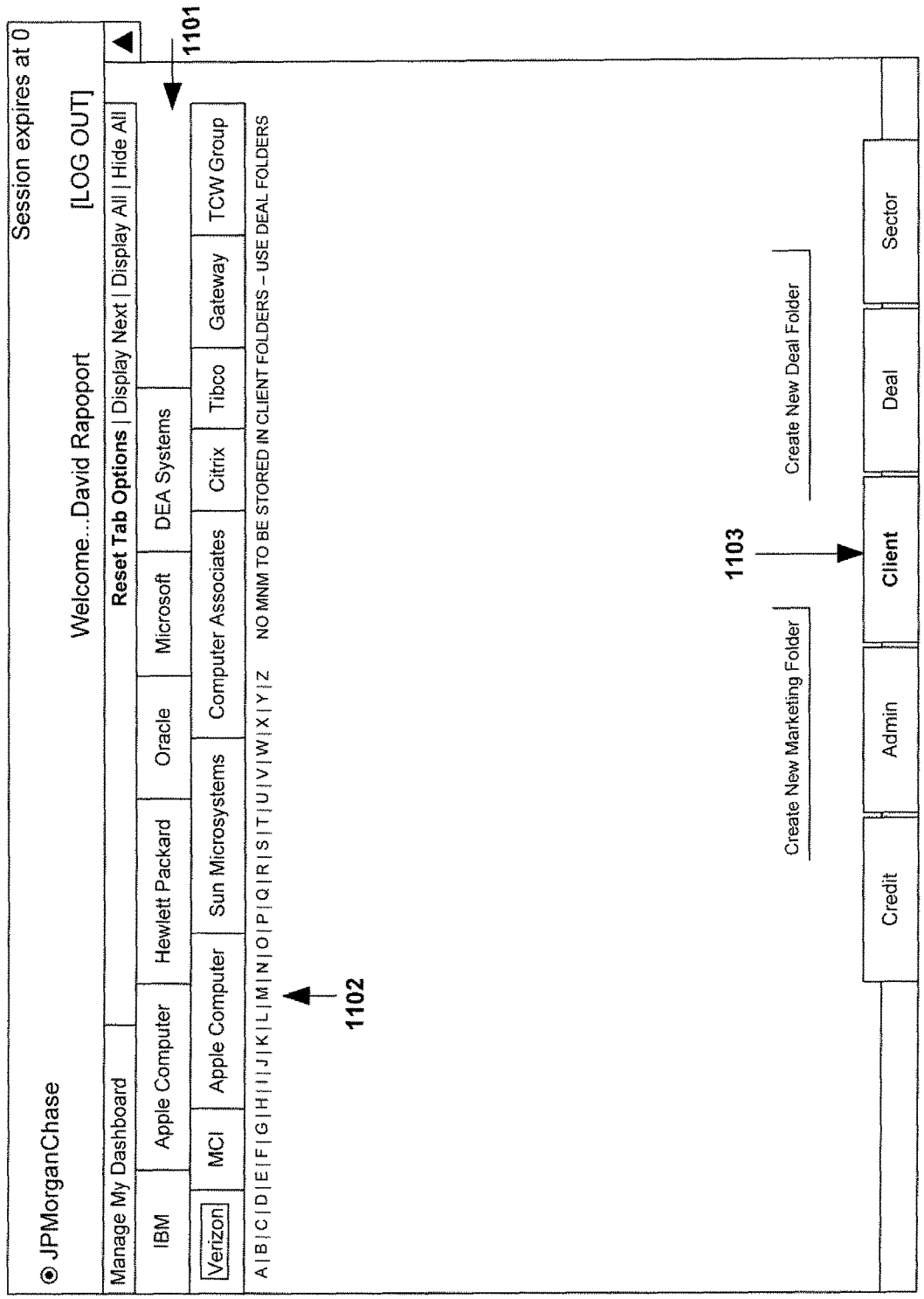
Figure 11F:
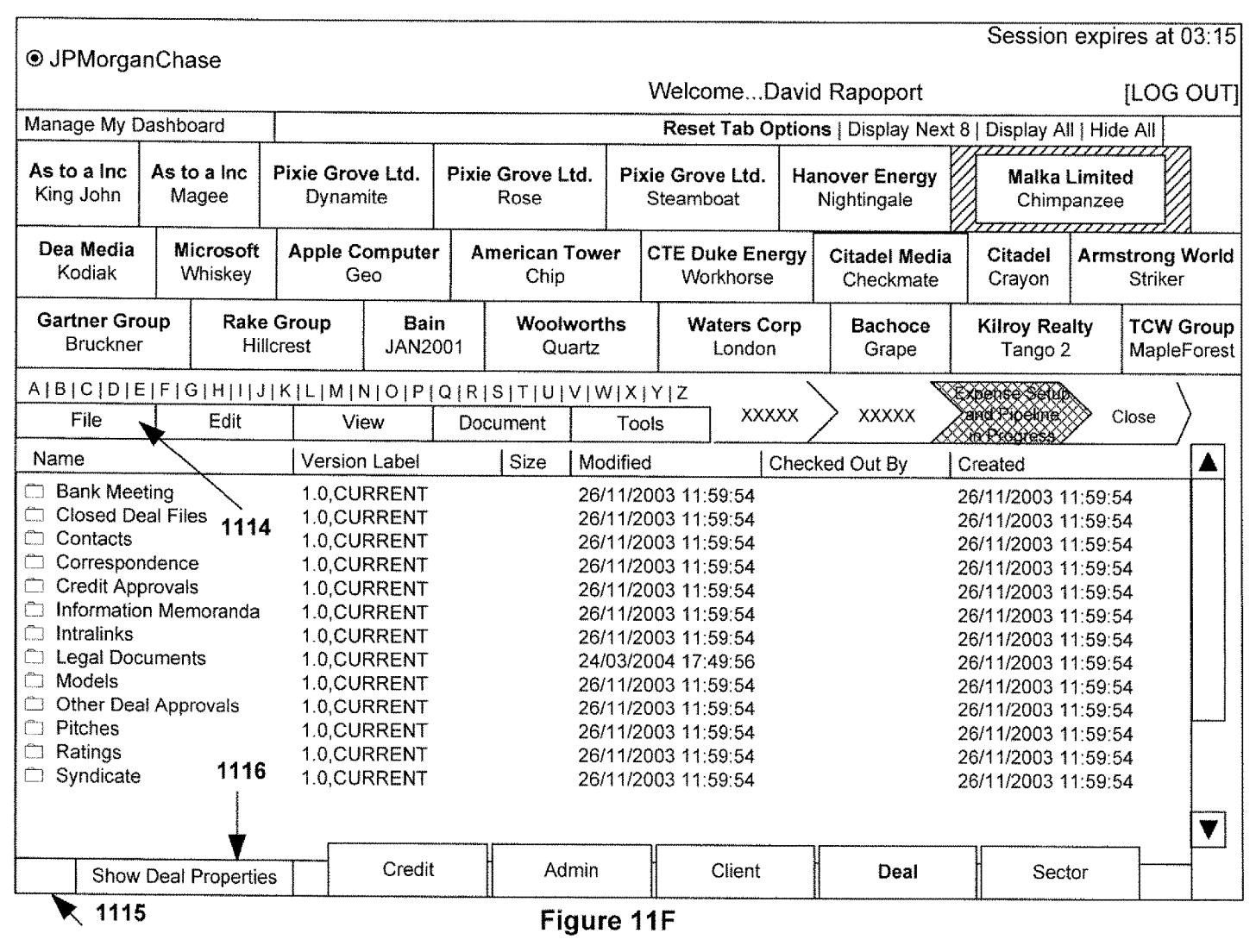
Figure 11G:
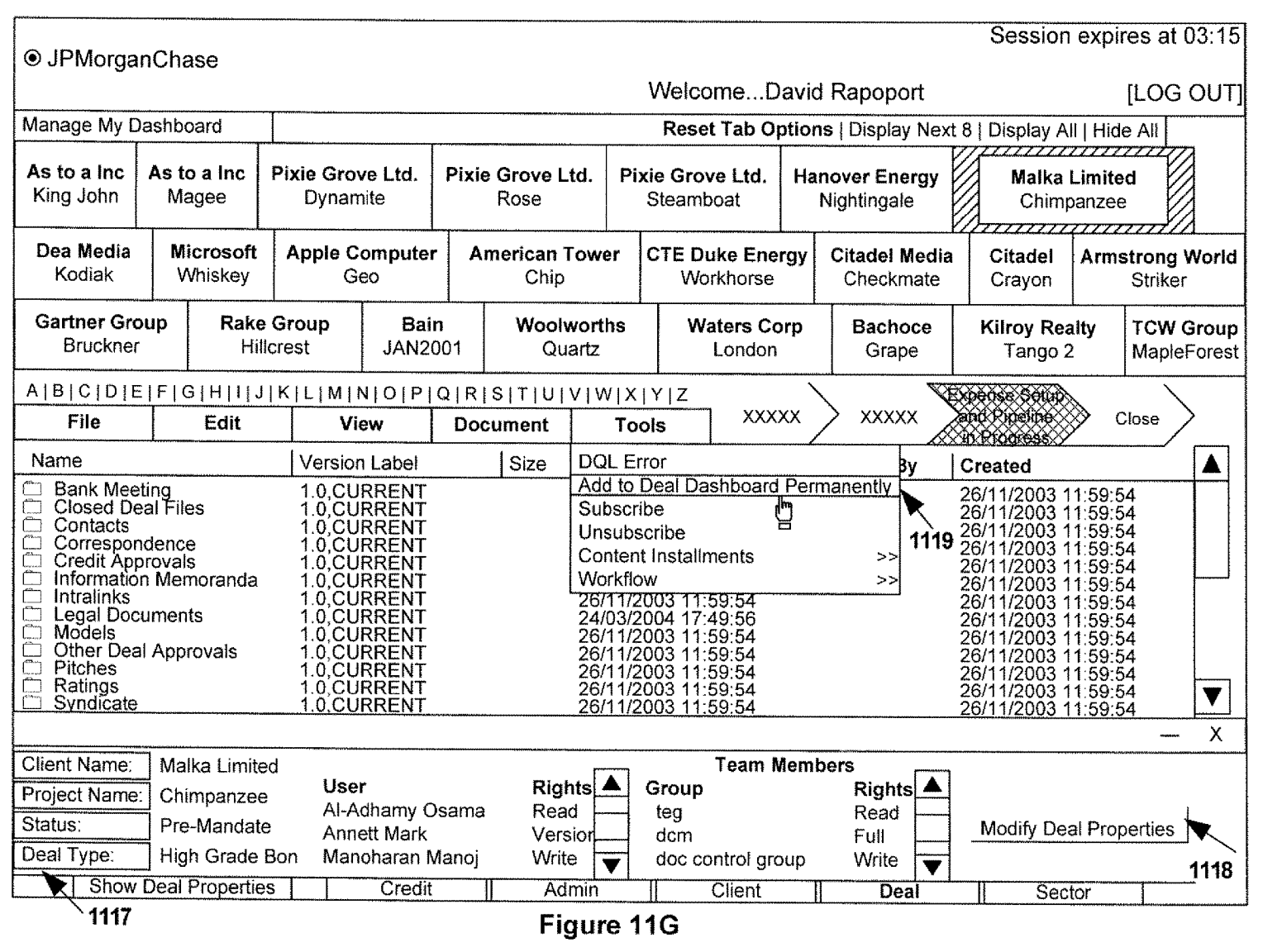
Figure 11H:
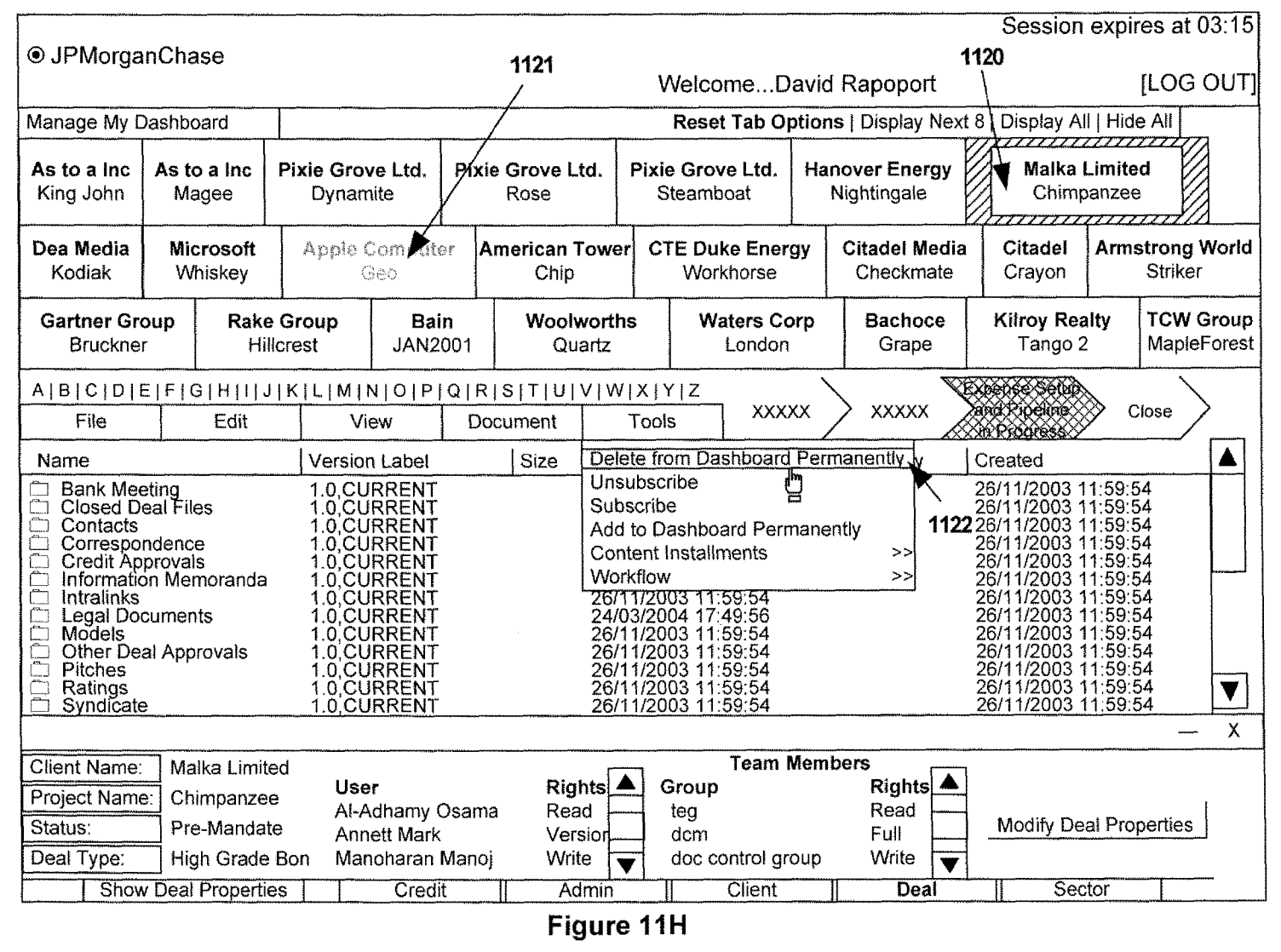

The DW system allows the DW user to navigate through different screens when the Client tab is selected in the Navigation tab. FIGS. 11A-1 are diagrams illustrating some exemplary navigation functions of the DW system in accordance with one embodiment of the present invention. Once the DW user is logged in, the first screen displays the following items: a client dashboard which displays clients that the DW user is working on 1101 as shown in FIG. 11A. An A-Z selection menu wherein a user can choose to list the clients according to client name 1102. This screen appears as a result of selecting the Client tab in the Navigation Bar 1103. Suppose the user wants to find a client that is not present in the client dashboard. The user clicks on alphabet M (assuming the client name starts with M) in the A-Z selection menu. This lists all the client names starting with M as shown in FIG. 11B. The DW user can browse through the client name lists by scrolling up or down using the scroll bar. The DW user clicks on the client name (e.g., Malka Limited) 1104. The DW system adds the client Malka Limited to the client dashboard 1105 as shown in FIG. 11C. This is only a temporary addition and this client will not be present in the client dashboard when the user logs on the next session. The selection of Malka Limited from the A-Z selection menu opens up the client marketing folder for the client. It expands the folders to 2 levels within the folder structure. The DW user can see two additional buttons in the navigation tab at the bottom called Show Client Info 1106 and Show Deal Info 1107. Both these buttons work as toggle buttons. The DW user clicks on Show Deal Info Button. This brings up a window which displays different deals under the client by project names and products 1108 as shown in FIG. 11D. The user can use the scroll bar to see the different deals under the client. The DW user clicks on Show Client Info to display the client information. The DW system now displays a client information window 1109. The Show Deal Info button has changed to Hide Deal Info 1110 and the DW user can click this to hide the Deal Info part of the screen. The DW user can click on Hide Client Info tab 1111 to hide the client information window. To see the documents in the client marketing folder, the DW user clicks on one of the folders in the client marketing folder (e.g., DCM→Presentations) 1112 as shown in FIG. 11E. To see the deal documents, the DW user clicks on one of the deals (e.g., Project Chimpanzee) inside the client deal information window 1113 as shown in FIG. 11D. The menu bar with File, Edit and other options is also displayed 1114 as shown in FIG. 11F. The DW user can also see status of the deal folders 1115. If the DW user clicks on Show Deal Properties button 1116, the deal information is displayed at the bottom of the screen on a separate pane 1117 as shown in FIG. 11G. This includes the information on client name, project name, and status and deal type. There is also an option for editing the deal team properties by clicking Modify Deal Properties button 1118. The deal folder is chequered because it is only a temporary addition. This means that this deal folder will disappear from the dashboard when the user logs off and logs in next time. The DW user selects the deal and clicks Tools→Add to Deal Dashboard Permanently 1119. This will add the deal Project Chimpanzee to the deal dashboard permanently and remove the chequered appearance 1120 as shown in FIG. 11H. If the DW user decides to remove the deal Apple computer—Geo from the deal dashboard, the DW user clicks on Apple Computer in the deal dashboard 1121. The DW user clicks on Tools→Delete from Dashboard Permanently 1122. The DW system displays the modified dashboard after the deletion. The DW user can selects multiple folders to add to the dashboard by ticking checkboxes 1123 as shown in FIG. 11I. The DW user clicks on Acid to Deal Dashboard button 1124. The DW system adds the deals to the deal dashboard and displays a message indicating that the deal folders have been added to the deal dashboard temporarily. The DW user can also click Add to Deal Dashboard Permanently 1125. The DW system adds the folders on to the deal dashboard and removes the check marks in the checkbox displaying a message indicating that the deal folders have been added permanently to the dashboard.

Figure 12:
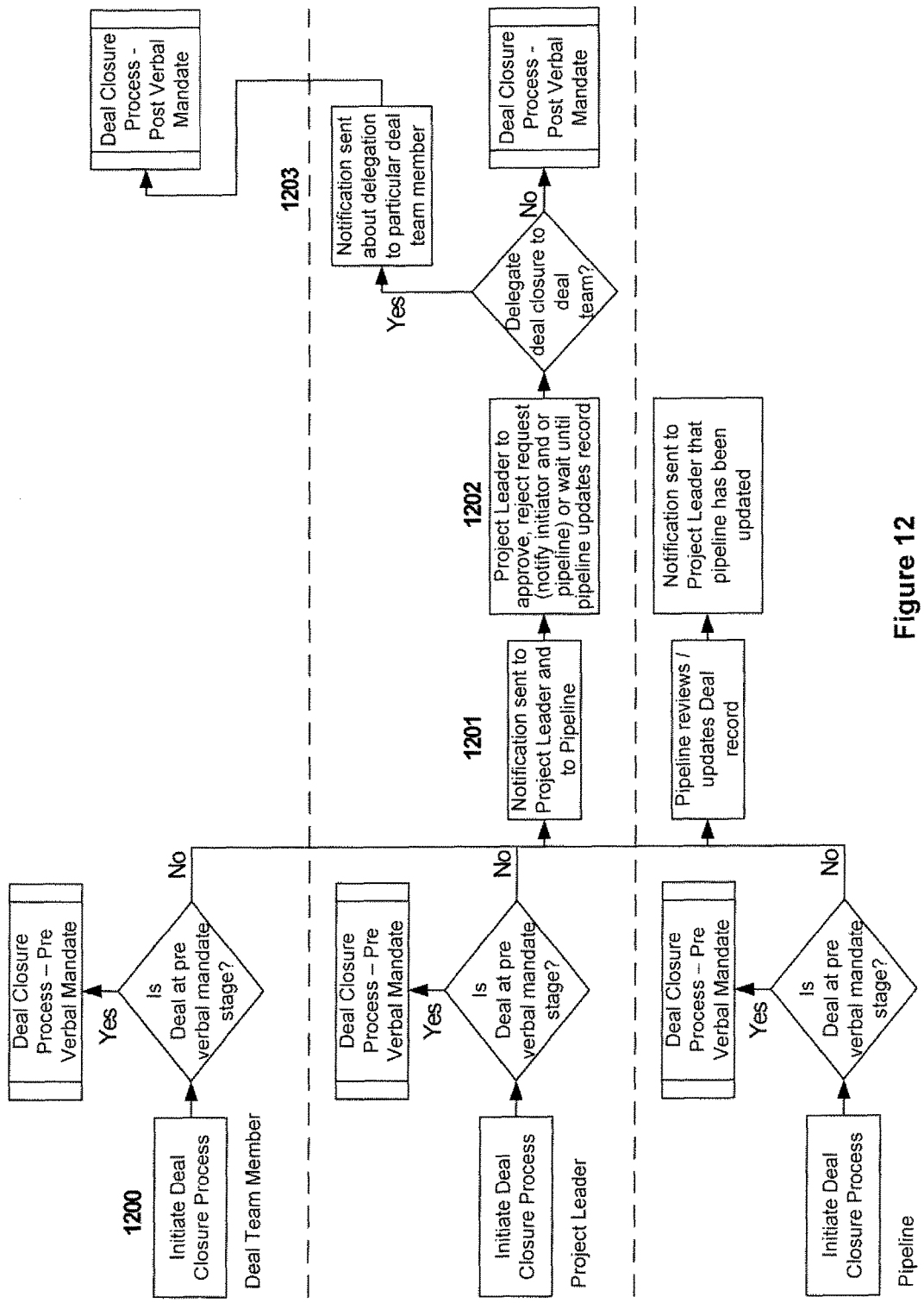
FIG. 12 is a flowchart showing a process of closing a deal in accordance with one embodiment of the present invention.

After successfully executing a deal, it will be closed. Each deal has its own closure process with respect to the actions that have to be taken, which is partly legal and partly financial. The deal closure has to do with making documentation for that deal and documents of record, as well as potentially making the information reusable to the appropriate audiences. The following is an exemplary embodiment illustrating how to close a merger and acquisition deal. FIG. 12 is a flowchart showing a process of closing the deal in accordance with one embodiment of the present invention. FIG. 13 is a diagram illustrating a list of deal-related files in the deal folder for closure in accordance with one embodiment of the present invention. FIG. 14 is a diagram illustrating a deal closure confirmation screen in accordance with one embodiment of the present invention. The process of FIG. 12 is described in connection with FIGS. 13-14 in order to set forth the process in a concrete fashion easily understood by the person of ordinary skills. However, this articulation of the process is exemplary only, and the process could be implemented differently from those of FIGS. 13-14.

As set forth in FIG. 12, when a DW user initiates a closure process 1200, he is warned about implications of the deal closure before the DW system commences deal closure for the deal. The user is presented with a message: "You are about to commence the deal closure process for a deal that achieved mandate status. This process is irreversible and at the end of the process files will be made read only. Seven days following closure only the current versions of files will be available. The project leader for this deal will need to provide final approval at the end of the closure process. The project leader for this deal is currently set as [project leader name], please contact your Pipeline/business manager if this is incorrect before continuing. Do you wish to continue?" Options are "Continue" and "Cancel". If the user selects "Cancel", then the DW system ends the deal closure process.

If the user selects "Continue", then the user is asked to select which documents are sensitive. The user is presented with a list of deal-related files in the deal folder with only the latest versions of the files being available as shown in FIG. 13. The user is presented with a message: "All data stored within Dealworks is already restricted to 'inside' business users. For further security please select those files which you do not wish to be visible to others outside the immediate deal team. For further guidance on what may constitute a sensitive (MMPI) file please discuss with your local compliance contact". The user is able to select those files which are sensitive via the checkbox's in the left most column of the list. There is no 'select all' option available. The user is also presented with the options "Cancel", "Continue", and "Save". If the user selects "Cancel", then the user is asked if they would like to save before canceling; if the user has requested to save, then he is informed "you may return to the deal closure process the next time you revisit this deal folder". If the user selects "Save", then the DW system sets the deal closure status to "In Progress" and save entries made in deal closure screens for the user to return to in future sessions.

If the user selects "Continue", then the DW system retains entries made in the deal closure screens for the user. The user is presented with a message: "Please complete the following checklist for the required documentation for this folder. For all documents please specify if the file is in Dealworks, in a cardboard archive box, or if the document is not applicable." After selecting, the user is presented with options "Cancel", "Save", "Back", and "Continue". If the user selects "Cancel", then the user is asked if they would like to save before canceling. If the user selects "Save", then the DW system sets the status bar to "In Progress" and saves entries made in the deal closure screens for the user to return to in future sessions. If the user selects "Back", then the DW system retains entries made in the deal closure screens for the user and progress to the step of selecting sensitive documents. If the user selects "continue", then the DW system retains entries made in deal closure screens for the user and checks are carried out to ensure that each row of the checklist has an option selected. If not, then the user is presented with an error message "Please complete all the rows in the checklist before proceeding further". Checks are also carried out to ensure that a valid cardboard box ID has been entered.

The DW user then updates the project description. The DW system presents the user with 3 sections. The first is an editable text box "Description" which is populated with contents of the fields "Summary of potential assignment" as captured at the Conflicts stage. The user is also displayed a message: "Please check/update the description for this project which will help identify it to others". The second is a pick list calendar and the message "Please select the date of deal closure". The third is a drop down box showing sub products for that particular product area. The drop down box will be set to the current sub product that was selected as part of the deal folder creation. The user is also presented with a message "This deal folder is currently associated with the following type of product. Please update this if this is incorrect". Options are "Cancel", "Continue", "Save", and "Back". If the user selects "Cancel", then the user is asked if they would like to save before canceling and if the user has requested a save, now or prior to this stage, then they are informed "You may return to the deal closure process the next time you revisit this deal folder", then the use case ends. If the user selects "Save", then the DW system changes the deal closure status to "In Progress", and saves the entries made in the deal closure screens for the user to return to in future sessions. If the user selects "Back", then the DW system retains the entries made in the deal closure screens for this session for the user and progresses to the step of the deal file checklist. If the user selects "Continue", then checks are carried out to ensure that all three sections have been completed.

If the DW user is a member of the deal team but not a project leader, then the user is presented with a message "Please note that the deal file checklist and details of the files which you have marked as being sensitive/non-sensitive will now be sent to the project leader for review. If the project leader approves the closure of this deal folder then the project folder will be renamed with the addition of the deal closure date and the sub product type". Options are "Cancel", "Save", and "Continue". If the user selects "Cancel" and if the user has previously saved progress during the deal closure process, then the user is informed "You may return to the deal closure process the next time you revisit this deal folder". If the user selects "Cancel" and the user has not previously saved progress during the deal closure progress, then the user is asked if they would like to save their changes. If the user selects "Save", then the DW system sets the flag Final Deal Documentation to "In Progress" and saves entries made in deal closure screens for the user to return to in future sessions. If the user selects "Continue", then the following notification is sent to the project leader: "The deal folder [folder name] has been marked for closure by [deal team members' name]. Please review the deal folder and the associated deal file checklist by clicking on the link below [URL of deal folder]. After reviewing the deal folder please approve or rejects this closure request in Dealworks. If you have received this message in error or are not the project leader for this deal folder, then please contact the Pipeline/business manager".

The project leader clicks on the URL in the notification which takes him/her to the deal folder and the deal closure screens 1201. The project leader is able to make modifications to which files are to be marked as sensitive and which files are included as part of the deal file checklist. The project leader then has the ability to approve or reject the closure request 1202. If the project leader clicks on reject, then the following actions occur: (1) The project leader is required to enter a brief explanation of why they are rejecting the deal closure request. (2) A notification is sent to the deal closer 1203 and to the pipeline along with the comments entered by the project leader; the wording of the notification will be "The deal closure process for [project name] has been rejected by [project leader name] for the following reasons: [comments from project leader]. (3) The data entered during the deal closure process is retained. (4) The deal closure status is updated to "Reject/In Progress", with an associated yellow color on the deal status bar. (5) The date/time of the rejection is stored in the closure screen so that it is visible to Pipeline/business managers and to the deal team.

If the project leader decides to approve the request, he is prompted that the documents are checked out and locks that need to be broken as shown in FIG. 14. A notification is sent to the deal team, ECAG (i.e., a group that uses FAMIS to support the internal business in expense capture and reporting) and Pipeline/business manager "The deal folder [old deal folder name] has been closed by the project leader [project leader name] and has been given the new name of [new deal folder name]. After 7 days only the latest versions of files will be retained. If you have any issues or concerns, please contact the project leader." The deal closure status is updated to "Closed". The deal status bar is stored in the closure screen so that it is visible to Pipeline/business managers and to the deal team. The color of folder as it appears in Dealworks is changed to show the new closed status. Copy of the deal file checklist is sent to the London control room. After seven days only the latest versions of files are retained.

Although an illustrative embodiment of the present invention, and various modification thereof have been described in detail herein with reference to the accompanying figures, it is to be understood that the invention is not limited to this precise embodiment and the described modifications, and that various changes and further modifications may be effected therein by one skilled in the art without departing from the scope or spirit of the invention as defined in the claims.

The invention claimed is:

1. A computer implemented system for executing and integrating a whole lifecycle of a deal, wherein the computer implemented system comprises at least a programmed computer processor which communicates with a deal team and other functional entities via a communication network, the computer implemented system comprising:
   (a) a deal workspace which is an electronic folder structure for securely storing and sharing documents related to the deal using the programmed computer processor;
   (b) a conflicts approval module, comprising a processor, configured to carry out a conflicts approval process based at least in part on a determination of a product associated with the deal as the deal becomes a formal pitch via interacting with a conflicts approval office and the deal team, wherein the formal pitch involves the deal team winning a sale of the product to a client;
   (c) an expense tracking pipeline, comprising a processor, configured to track expenses occurring during the deal lifecycle and reporting to a financial institution with classified information;
   (d) a navigation module, comprising a processor, configured to allow a deal team member to access and edit documents and information via the communication network in real-time of all the deals that the deal team member is working on and all the clients that the deal team member is working with; and
   (e) a deal closure module, comprising a processor, configured to close the deal which achieved mandate status, making documentation for that deal, and making the information reusable to appropriate clients.

2. The computer implemented system of claim 1, wherein said deal workspace is accessible to the deal team.

3. The computer implemented system of claim 1, wherein said deal workspace is accessible to the deal team, the client, and the deal-involved entities, each of which has its well-defined and secured domain.

4. The computer implemented system of claim 1, wherein said deal workspace is created by steps comprising:
   (a) reading a client name and searching for a client folder, creating a client folder;
   (b) creating a deal folder and subfolders for the deal;
   (c) adding a tab to deal team members' active deals display;
   (d) notifying the deal team members via their default notification method of the creation of the deal workspace;
   (e) opening the new deal workspace tab for the deal team member who created the deal; and
   (f) creating a deal status bar.

5. The computer implemented system of claim 1, wherein said conflicts approval module carries out the conflicts approval process by steps comprising:

(a) opening a conflicts form;
(b) pre-populating fields gathered at creation of the deal workspace;
(c) entering conflicts information in the conflicts form by a deal team member;
(d) submitting the conflicts form by the deal team member;
(e) saving the conflicts information to the deal record;
(f) sending an alert to a conflicts mailbox; and
(g) updating the deal status bar on the deal workspace by said system.

6. The computer implemented system of claim 1, wherein said expense tracking pipeline is set up by steps comprising:
(a) opening an expense setup and pipeline tab;
(b) pre-populating fields gathered at creation of the deal workspace;
(c) entering expense setup and pipeline information in the expense setup and pipeline tab by a deal team member;
(d) submitting the expense setup and pipeline form by the deal team member;
(e) saving the information to the deal record; and
(f) updating the deal status bar on the deal workspace.

7. The computer implemented system of claim 1, wherein said navigation module has navigation functions comprising:
(a) displaying clients, which a deal team member is working on, on a client dashboard;
(b) adding a client which is not on the dashboard from alphabetical clients selection menu to the dashboard;
(c) opening up the client's marketing folder by selecting a client;
(d) seeing documents in the client's marketing folder;
(e) opening a window to show the selected client's information;
(f) opening a window to show the selected client's deal information;
(g) clicking a deal in the deal information window to see its deal documents and information;
(e) editing deal information; and
(f) adding a deal to the dashboard or remove a deal from the dashboard.

8. The computer implemented system of claim 1, wherein said deal closure module closes the deal by steps comprising:
(a) initiating a deal closure process by a deal team member;
(b) selecting and saving sensitive documents in a deal-related file list by the deal team member;
(c) completing and saving a checklist of the deal-related files by the deal team member;
(d) submitting a deal closure request for approval by the deal team member;
(e) sending a notification to the project leader and the expense tracking pipeline;
(f) approving the deal closure request by the project leader;
(g) renaming the project folder with addition of the deal closure date and the sub project type; and
(h) sending a decision notification to the deal team and the expense tracking pipeline.

9. The computer implemented system of claim 1, wherein said deal is a financial product a financial institution provides to clients, comprising:
(a) merger and acquisition for doing financial restructuring including helping clients buy companies, merge with companies, and sell or spin off divisions into new companies;
(b) equity capital market for issuing equity into the capital markets;
(c) debt capital market for issuing varying types of debt including bonds, loans, and leveraged financial into the capital markets; and
(d) global credit risk management for managing credit risk of the financial institution with respect to the outstanding credit to its clients.

10. The computer implemented system of claim 1, wherein said whole lifecycle of a deal comprises creating a deal workspace for the new deal, carrying out conflicts approval requirement, setting up an expense tracking pipeline, and closing the deal.

11. The computer implemented system of claim 1, wherein said deal team is a functional group, which comprises personnel of a financial institution and carries out the deal including setting up the deal, analyzing, pitching, winning, executing, and closing mandates.

12. The computer implemented system of claim 1, wherein said other functional entities comprise a conflicts approval office which decides whether the deal-related matters meet conflicts requirement and business managers.

13. A method of executing and integrating the whole lifecycle of a deal via a programmed computer processor and interacting with a deal team and other functional entities via a communication network, comprising the steps of:
(a) creating, using the programmed computer processor, a deal workspace which is a computer-based folder structure for securely storing and sharing documents related to the deal, by a deal team member;
(b) carrying out, at a conflicts approval module using the programmed computer processor, a conflict approval process based at least in part on a determination of a product associated with the deal as the deal becomes a formal pitch via interacting with a conflicts approval office and the deal team, wherein the formal pitch involves the deal team winning a sale of the product to a client;
(c) setting up, at an expense tracking pipeline using the programmed computer processor, an expense tracking pipeline for the deal for tracking and reporting expenses with classified information occurring during the deal lifecycle;
(d) accessing and editing, at a navigation module using the programmed computer processor, documents and information in real-time of all the deals that a deal team member is working on and all the clients that he is working with; and
(e) closing, at a deal closure module using the programmed computer processor, the deal which achieved mandate status for making documentation for that deal and potentially making the information reusable to appropriate clients.

14. The method of claim 13, wherein the step of creating a deal workspace for a deal comprises:
(a) reading a client name and searching for a client folder, or creating the client folder;
(b) creating a deal folder and sub folders for the deal;
(c) adding a tab to deal team members' active deals display;
(d) notifying the deal team members via their default notification method of the creation of the deal workspace;
(e) opening the new deal workspace tab for the deal team member who created the deal; and
(f) creating a deal status bar.

15. The method of claim 13, wherein the step of carrying out a conflicts approval process comprises:
(a) opening a conflicts form;
(b) pre-populating fields gathered at creation of the deal workspace;
(c) entering conflicts information in the conflicts form by a deal team member;
(d) submitting the conflicts form by the deal team member;
(e) saving the conflicts information to the deal record;
(f) sending an alert to a conflicts mailbox; and
(g) updating the deal status bar on the deal workspace.

16. The method of claim 13, wherein the step of setting up an expense tracking pipeline for the deal comprises:
(a) opening an expense setup and pipeline tab;
(b) pre-populating fields gathered at creation of the deal workspace;
(c) entering expense setup and pipeline information in the expense setup and pipeline tab by the deal team;
(d) submitting the filled expense setup and pipeline form by the deal team;
(e) saving the information to the deal record; and
(f) updating the deal status bar on the deal workspace.

17. The method of claim 13, wherein the step of closing the deal comprises:
(a) initiating a deal closure process by a deal team member;
(b) selecting and saving sensitive documents in a deal-related file list by the deal team member;
(c) completing and saving the checklist of the deal-related files by the deal team member;
(d) submitting a deal closure request for approval by the deal team member;
(e) sending a notification to the project leader and the expense tracking pipeline;
(f) approving the deal closure request by the project leader;
(g) renaming the project folder with addition of the deal closure date and the sub project type; and
(h) sending a decision notification to the deal team and the expense tracking pipeline.

18. The method of claim 13, wherein the step of closing the deal comprises:
(a) initiating a deal closure process by a deal team member;
(b) selecting and saving sensitive documents in a deal-related file list by the deal team member;
(c) completing and saving the checklist of the deal-related files by the deal team member;
(d) submitting the deal closure request for approval by the deal team member;
(e) sending a notification to the project leader and the expense tracking pipeline;
(f) rejecting the deal closure request accompanied by a brief explanation by the project leader; and
(g) sending a decision notification to the deal team and the expense tracking pipeline.

19. A method of executing and integrating the whole lifecycle of a deal via a programmed computer processor and interacting with a deal team and other functional entities via a communication network, comprising the steps of:
(a) creating, using the programmed computer processor, a deal workspace which is a computer-based folder structure for securely storing and sharing documents related to the deal, and is accessible to the deal team, the client, and the deal-involved entities, comprising:
(a1) reading a client name and searching for a client folder, or creating the client folder;
(a2) creating a deal folder and sub folders for the deal;
(a3) adding a tab to deal team members' active deals display;
(a4) notifying the deal team members via their default notification method of the creation of the deal workspace;
(a5) opening the new deal workspace tab for the deal team member who created the deal; and
(a6) creating a deal status bar;
(b) carrying out, at a conflicts approval module using the programmed computer processor, a conflict approval process as the deal becomes a formal pitch via interacting with a conflicts approval office and the deal team, wherein the formal pitch involves the deal team winning a sale of the product to a client, comprising:
(b1) opening a conflicts form;
(b2) pre-populating fields gathered at creation of the deal workspace;
(b3) entering conflicts information in the conflicts form by the deal team member;
(b4) submitting the conflicts form by the deal team member;
(b5) saving the conflicts information to the deal record;
(b6) sending an alert to a conflicts mailbox; and
(b7) updating the deal status bar on the deal workspace;
(c) setting up, at an expense tracking pipeline using the programmed computer processor, an expense tracking pipeline for the deal for tracking and reporting expenses with classified information occurring during the deal lifecycle, comprising
(c1) opening an expense setup and pipeline tab;
(c2) pre-populating fields gathered at creation of the deal workspace;
(c3) entering expense setup and pipeline information in the expense setup and pipeline tab by the deal team;
(c4) submitting the filled expense setup and pipeline form by the deal team;
(c5) saving the information to the deal record; and
(c6) updating the deal status bar on the deal workspace;
(d) accessing and editing, at a navigation module using the programmed computer processor, documents and information in real-time of all the deals that the deal team member is working on and all the clients that he is working with; and
(e) closing, at a deal closure module using the programmed computer processor, the deal which achieved mandate status for making documentation for that deal and making the information reusable to appropriate clients, comprising:
(e1) initiating a deal closure process by the deal team member;
(e2) selecting and saving sensitive documents in a deal-related file list by the deal team member;
(e3) completing and saving the checklist of the deal-related files by the deal team member;
(e4) submitting a deal closure request for approval by the deal team member;
(e5) sending a notification to the project leader and the expense tracking pipeline;

(e6) approving the deal closure request by the project leader;
(e7) renaming the project folder with addition of the deal closure date and the sub project type; and
(e8) sending a decision notification to the deal team and the expense tracking pipeline.

* * * * *